May 24, 1966  J. V. DAVIS  3,252,603
SHUTTLE CONVEYING MACHINE WITH INDEPENDENTLY
ELEVATABLE LOAD ENGAGING MEANS
Filed Nov. 5, 1962  10 Sheets-Sheet 1
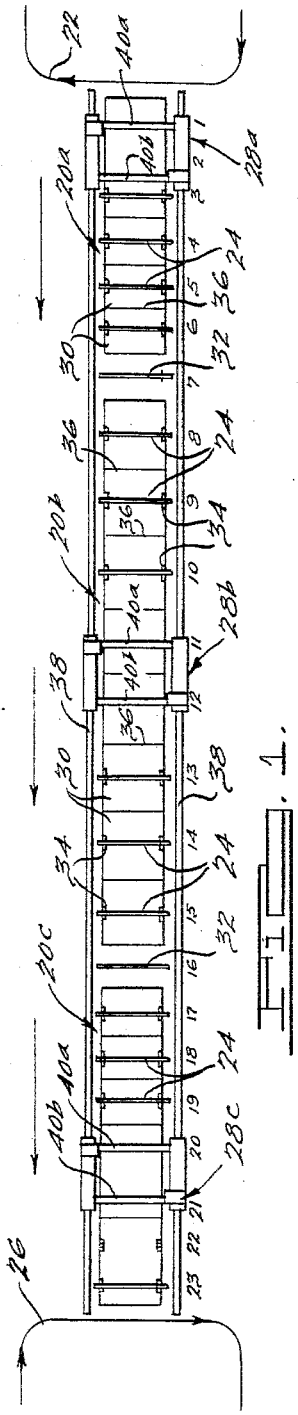
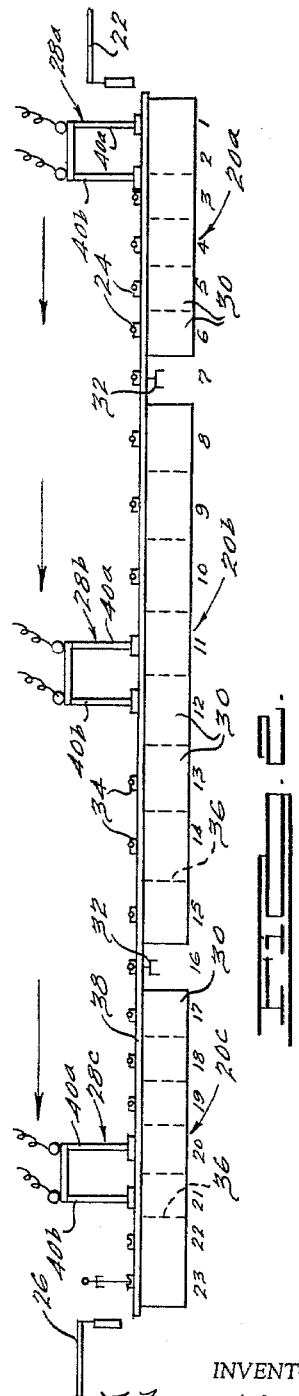
INVENTOR.
John V. Davis.
BY
Karnes, Dickey & Pierce
ATTORNEYS

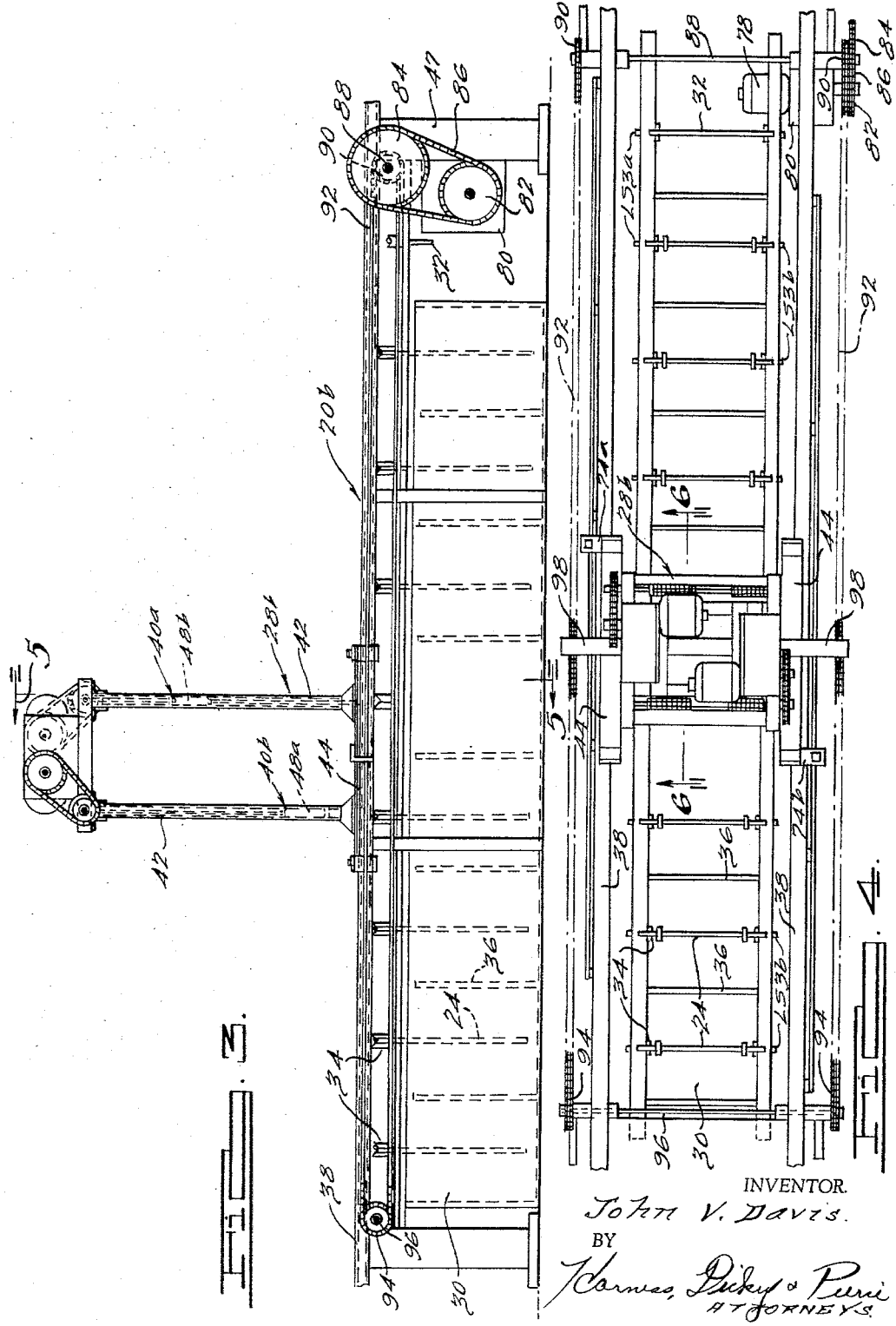

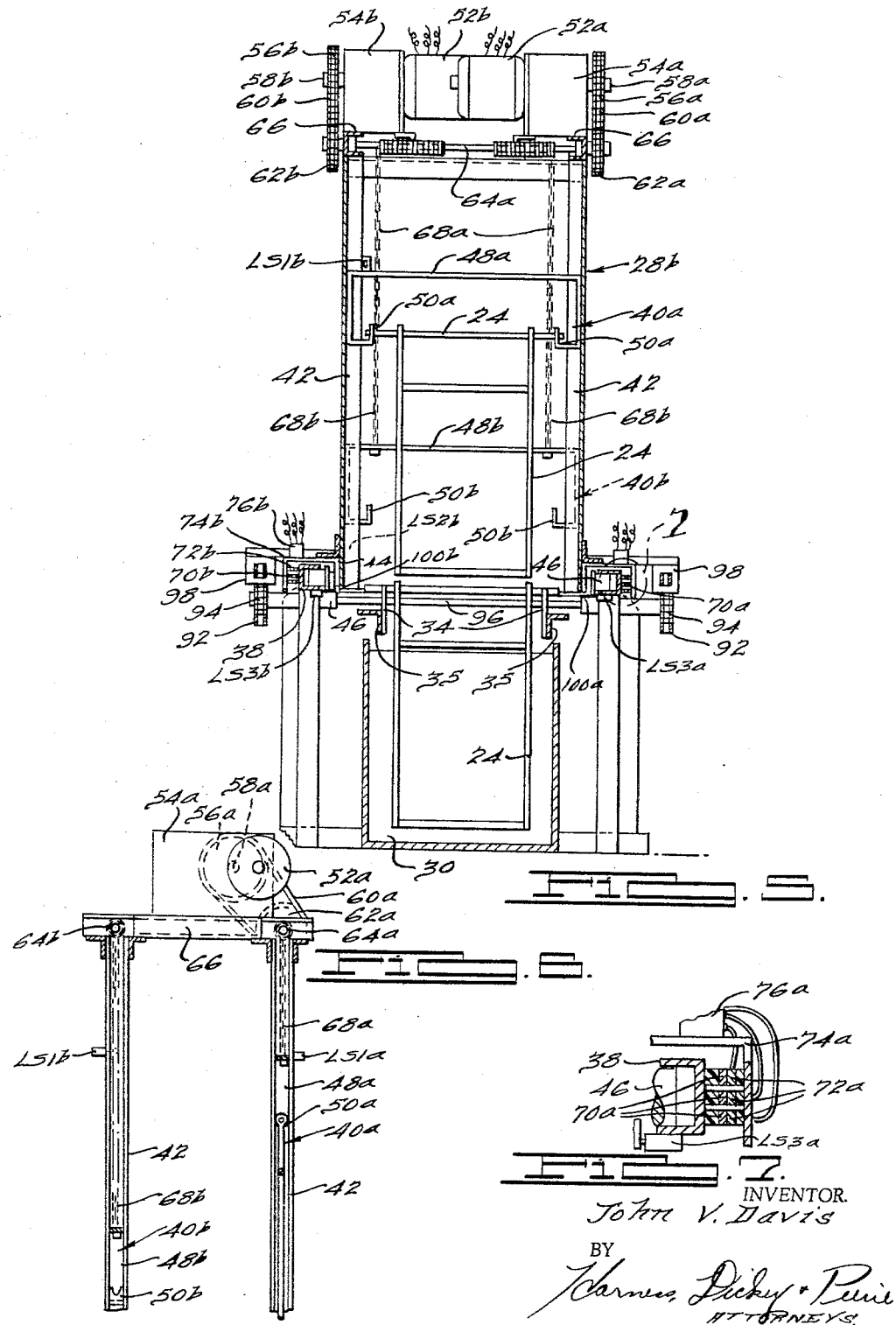

May 24, 1966
J. V. DAVIS
3,252,603
SHUTTLE CONVEYING MACHINE WITH INDEPENDENTLY
ELEVATABLE LOAD ENGAGING MEANS
Filed Nov. 5, 1962
10 Sheets-Sheet 4
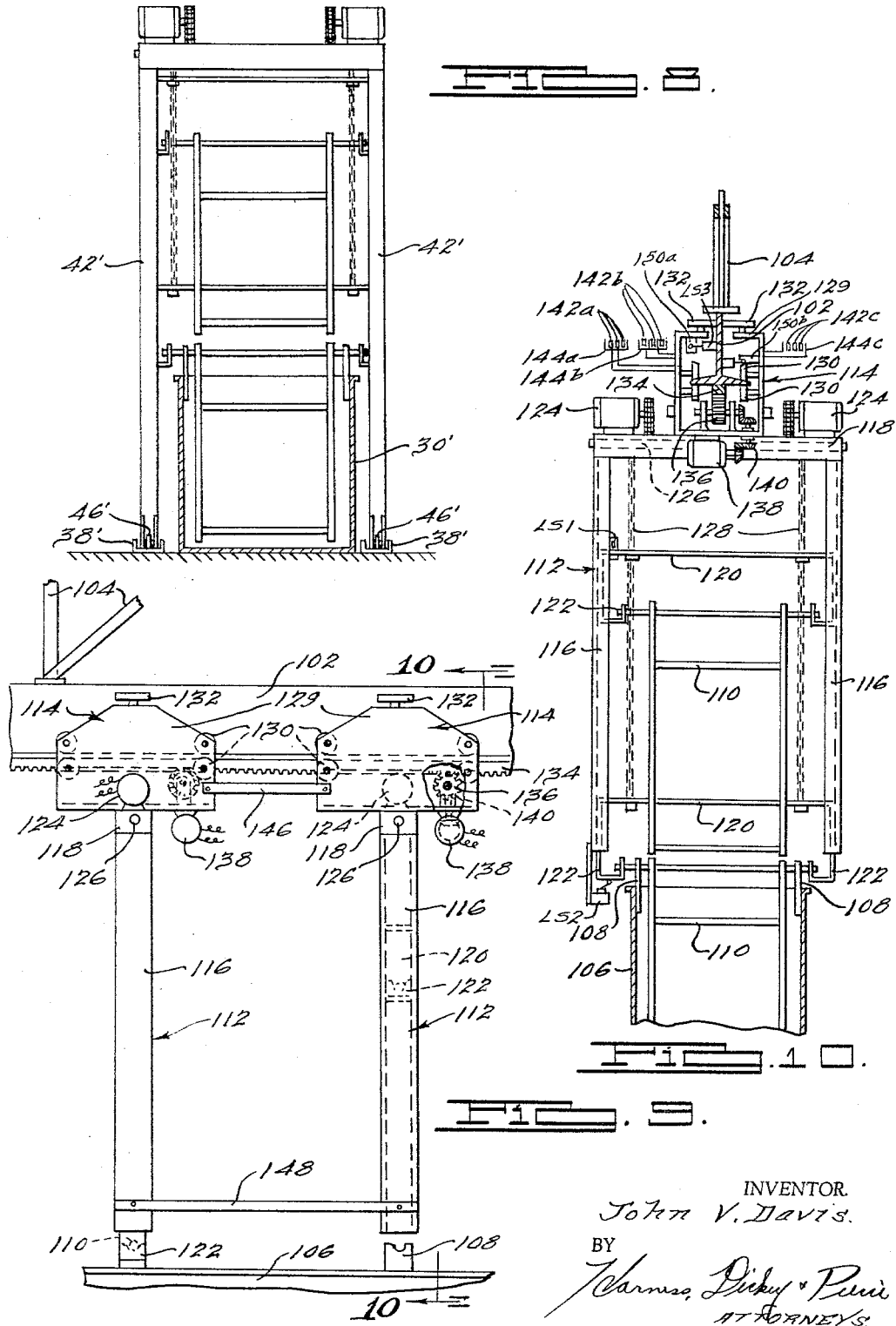

May 24, 1966   J. V. DAVIS   3,252,603
SHUTTLE CONVEYING MACHINE WITH INDEPENDENTLY
ELEVATABLE LOAD ENGAGING MEANS
Filed Nov. 5, 1962   10 Sheets-Sheet 5

INVENTOR.
John V. Davis.
BY
Harness, Dickey & Pierce.
ATTORNEYS.

INVENTOR.
John V. Davis
BY
Harness, Dickey & Pierce
ATTORNEYS

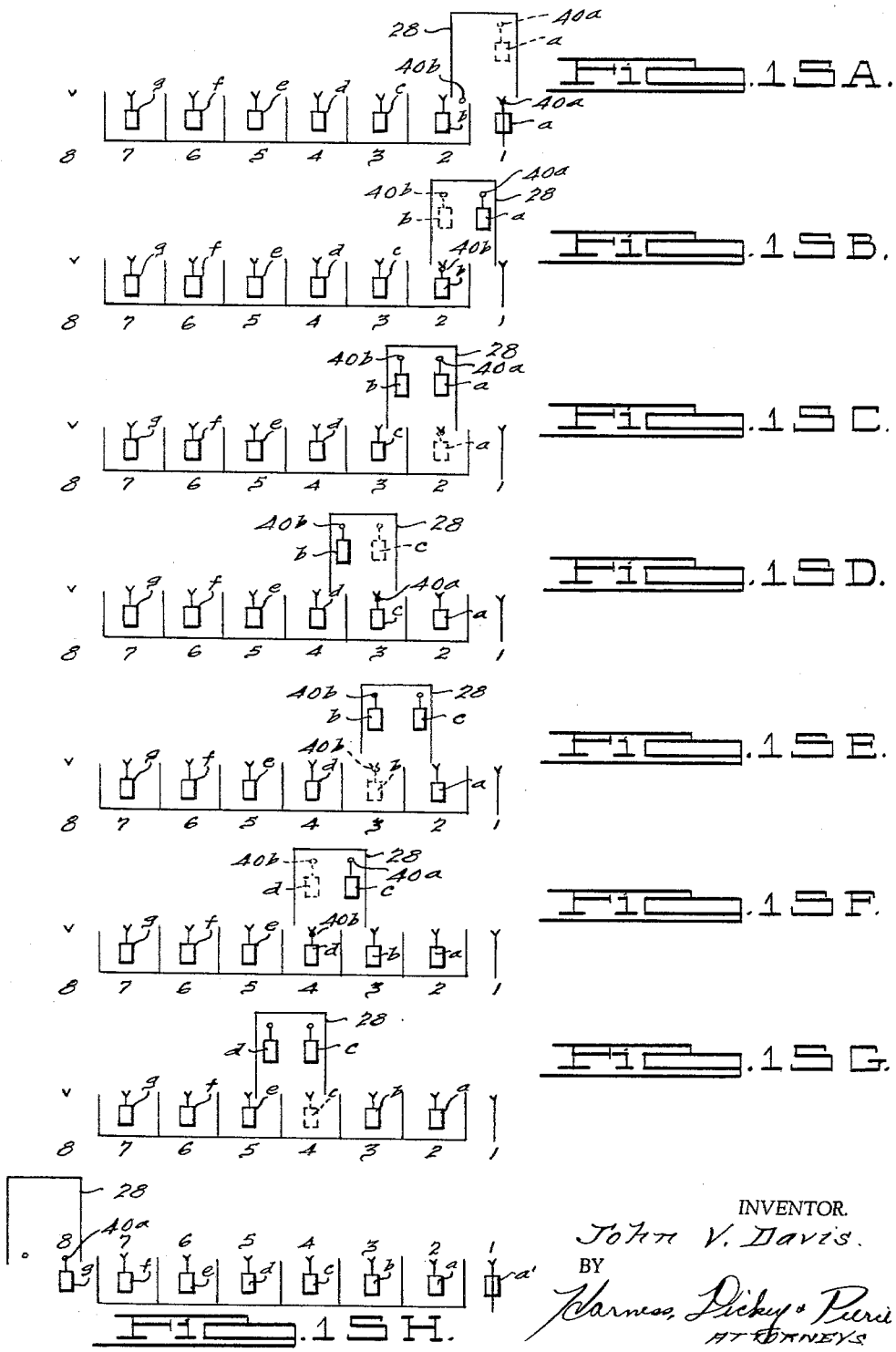

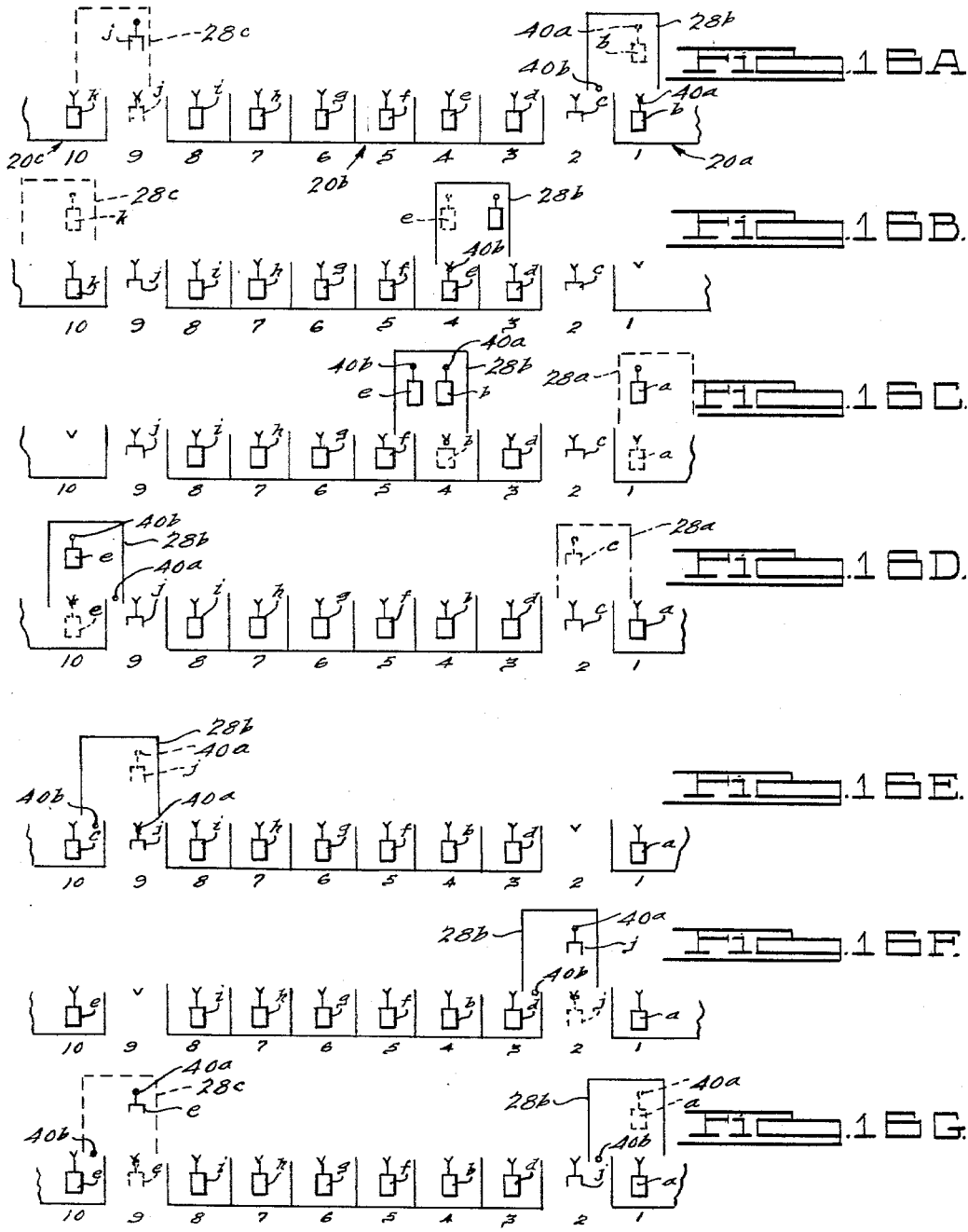

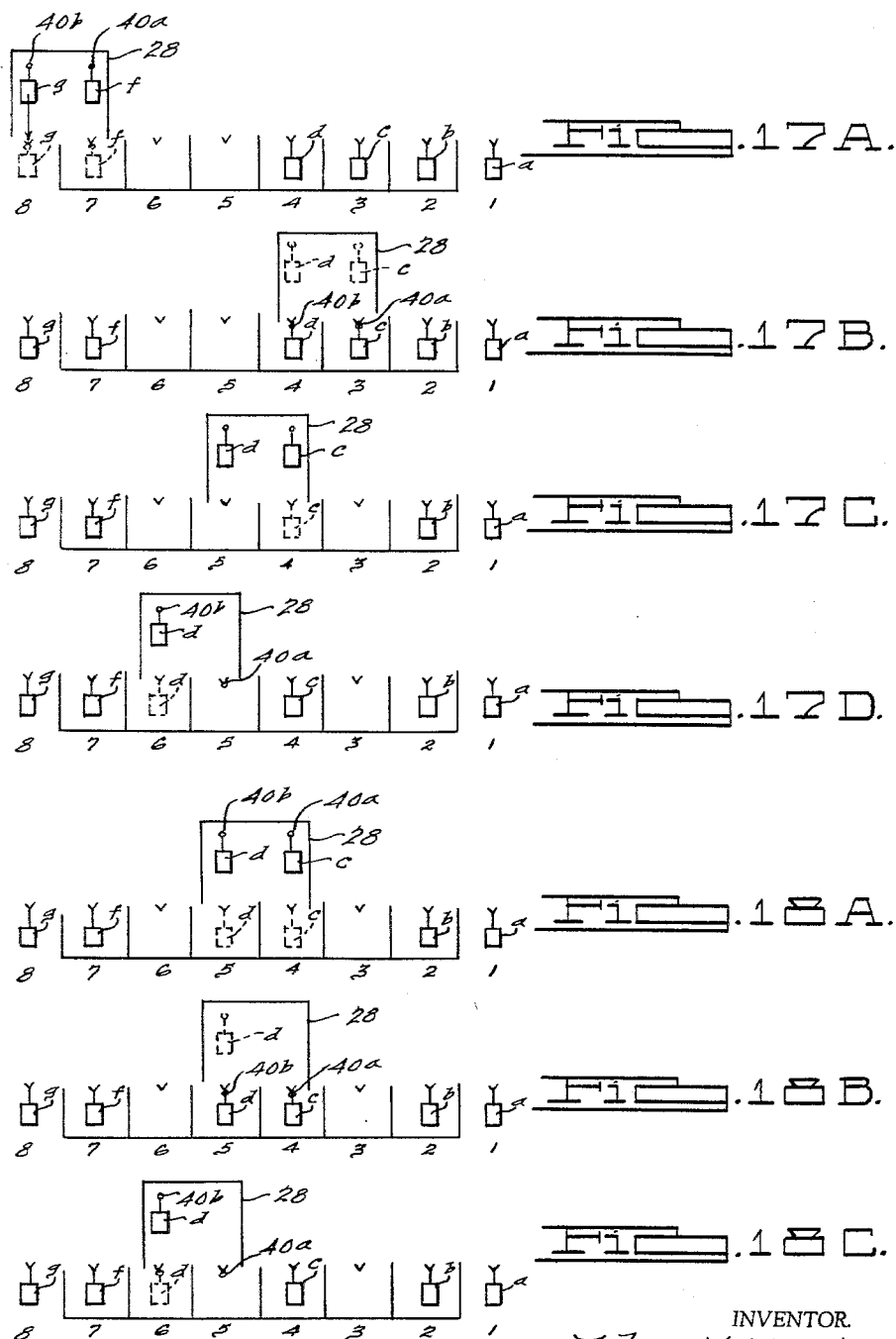

United States Patent Office 3,252,603
Patented May 24, 1966

3,252,603
SHUTTLE CONVEYING MACHINE WITH INDEPENDENTLY ELEVATABLE LOAD ENGAGING MEANS
John V. Davis, Grosse Pointe Farms, Mich., assignor to The Udylite Corporation, Detroit, Mich., a corporation of Delaware
Filed Nov. 5, 1962, Ser. No. 235,310
14 Claims. (Cl. 214—86)

The present invention broadly relates to work handling apparatus and more particularly to a novel conveying machine of the straight-line type employing one or more shuttle carriages for conveying a plurality of workpieces through a series of liquid treating stations in an automatic preselected sequence.

Work handling apparatus of the general type to which the present invention is applicable is in widespread use in industry for the automatic handling and transportation of workpieces between successive manufacturing operations. These machines are particularly suitable for conveying workpieces through an automatic sequentially phased liquid treating cycle which may include one or more electrochemical and electroplating operations. In straight-line conveying apparatuses, the workpieces are conventionally loaded at one end of the machine and are unloaded from the opposite end thereof after having been subjected to a preselected sequential treating cycle. The increasing complexity and number of processing steps required in modern electroplating operations and the necessity for increased efficiency in the automatic handling of workpieces to be plated requires variations in the handling sequence of the workpieces in different sections of the treating cycle in order to achieve optimum efficiency. For example, in conventional precleaning and rinsing operations the workpieces can be advanced in succession from one treating station to the next adjoining treating station in ordered sequence. On the other hand, because of the complexity in the contour or configuration of some workpieces requiring nested anode arrangements to achieve a requisite uniformity in the plating on the surfaces thereof, a selected cell-type operating cycle is necessary wherein the loaded work racks are removed and inserted in selected ones of a plurality of treating cells.

The foregoing variations in the operating sequence of the work handling apparatus requires that the machine construction be specifically designed to accommodate such an operating sequence. In machines of the general type heretofore known, subsequent modifications in a prescribed treating cycle cannot be readily accommodated necessitating a relatively drastic and costly modification of the machine structure which seriously limits the versatility of the machine.

It is, accordingly, a primary object of the present invention to provide an improved conveying apparatus which overcomes the problems and disadvantages associated with conveying apparatus of similar type heretofore known.

Another object of the present invention is to provide an improved conveying apparatus incorporating one or more shuttle carriages which are operable to lift, convey and lower loaded work racks in any particular timed sequence along selected treating sections of the apparatus.

Still another object of the present invention is to provide an improved conveying machine which can be designed of any desired length and arrangement comprising a plurality of treatment sections, each of which is serviced by a shuttle carriage that is effective to transfer the loaded work racks through that section in a preselected sequence.

A further object of the present invention is to provide a conveying apparatus which is adapted to provide for selective skip or a short dip operation of selected ones of the work carriers at selected treating stations providing increased versatility and processing flexibility in comparison to that obtainable with work handling apparatuses of similar type heretofore known.

A still further object of the present invention is to provide an improved conveying apparatus employing one or a plurality of shuttle carriages, each of which incorporates a plurality of lift mechanisms that are independently operable to effect a lifting and lowering of work racks out of and into the treating stations therebelow.

Yet still another object of the present invention is to provide a novel conveying machine which is of simple and compact design, of durable construction, of economical manufacture and of simple operation and control.

The foregoing and other objects and advantages of the present invention are achieved by providing rail means disposed longitudinally of an aligned series of treating stations on which one or a plurality of shuttle carriages are movably mounted and which shuttle carriages incorporate two or more lift mechanisms thereon for selectively lifting and lowering work racks containing the workpieces to be treated into and out of the treating stations therebelow. The shuttle carriages are also operative in accordance with one embodiment of the present invention to transfer the empty work racks from the unload end of the machine back to the load end of the machine obviating the necessity of employing independent conveying means for handling the empty work racks.

Other objects and advantages of the present invention will become apparent from the following detailed description taken in conjunction with the accompanying drawings, wherein:

FIGURE 1 is a schematic plan view of an exemplary arrangement of a straight line conveying machine constructed in accordance with the present invention;

FIG. 2 is a schematic side elevation view of the straight-line conveying apparatus shown in FIG. 1;

FIG. 3 is a magnified side elevation view of one treating section of the straight-line machine shown in FIGS. 1 and 2;

FIG. 4 is a plan view of the machine section shown in FIG. 3;

FIG. 5 is a transverse sectional view through the plating machine section shown in FIG. 3 and taken along the line 5—5 thereof;

FIG. 6 is a longitudinal, vertical sectional view of the shuttle carriage as shown in FIG. 4 and taken along the line 6—6 thereof;

FIG. 7 is a magnified, fragmentary sectional view of the conductor rail for supplying electrical power to the lift mechanism motors of the shuttle carriage shown in FIG. 5 in the encircled area indicated at 7;

FIG. 8 is a transverse, vertical sectional view similar to FIG. 5 and illustrating another alternate satisfactory construction of the shuttle carriage and supporting rails;

FIG. 9 is a fragmentary, side elevation view of still another alternate satisfactory embodiment of the shuttle carriage previously shown comprising a plurality of single lift shuttles removably coupled to each other and movably supported on an overhead monorail;

FIG. 10 is a transverse, vertical sectional view of the shuttle carriage shown in FIG. 9 and taken along the line 10—10 thereof;

FIGS. 15A–15H are schematic side elevation views of the shuttle conveying machine illustrating the operating movements of the shuttle carriage and the lift mechanisms thereon for providing a so-called "shuttle transfer" of the work racks commencing at the load end station of the machine and progressing sequentially therefrom toward the unload station thereof;

FIGS. 16A–16G are schematic side elevation views illustrating a selective "cell-type" operating cycle wherein the work racks are selectively withdrawn from the treating cells and replaced by a new loaded work rack after which the withdrawn work rack is transferred to the unload station of the machine;

FIGS. 17A–17D are schematic side elevation views of the shuttle conveying machine illustrating the transfer movement and lift mechanism operation of the shuttle carriage to incorporate a skip cycle or operation in a double-life single-station advance of the loaded work racks in accordance with the sequence shown in FIGS. 13A–13D;

FIGS. 18A–18C are schematic side elevation views of the shuttle conveying machine illustrating a double-lift single-station advance cycle incorporating therein a short dip at a selected treating station;

Figure 11:
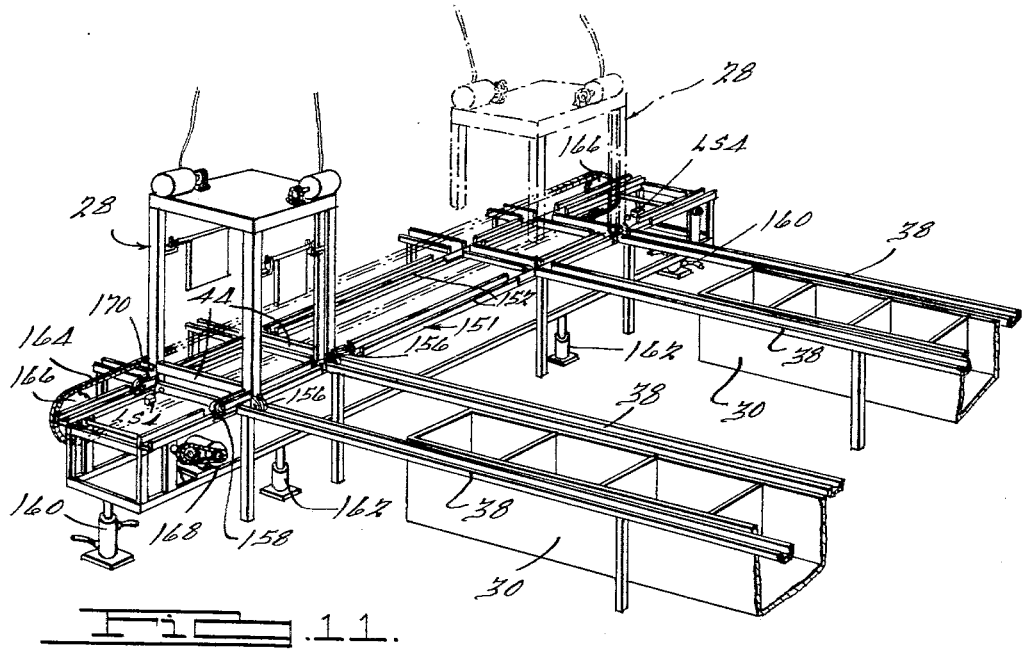
FIG. 11 is a fragmentary, perspective view of an end transfer mechanism for transferring a shuttle carriage laterally from one set of rails over an aligned series of treating receptacles to a second set of rails disposed above a second aligned row of treating receptacles adjacent thereto.

Referring now in detail to the drawings, an exemplary arrangement of the shuttle conveying machine comprising the present invention is illustrated schematically in FIGS. 1 and 2 wherein three machine sections designated 20a, 20b, and 20c, respectively, are arranged in end-to-end relationship forming a straight-line machine. In accordance with this general layout, workpieces are supplied to the input or load end of the machine by a suitable shop conveyor 22 from which the workpieces are removed and loaded on work racks 24 which in turn are transferred through a series of treating stations numbered 1 through 23 consecutively to the output or unload end of the machine. The workpieces are removed from the work racks at the unload end and are carried by a suitable shop conveyor 26 to the next manufacturing operation. Alternatively, the work racks 24 can be directly transferred to the shop conveyors 22, 26 and can be loaded or unloaded at a point remote from the load end and unload end portions of the conveying machine.

Each of the conveying machine sections 20a, 20b, 20c is provided with a shuttle carriage 28a, 28b, 28c, respectively, which is operative to transfer the loaded work racks 24 in the direction of the arrows through the aligned series of treating receptacles 30 comprising that section. In the exemplary layout illustrated in FIGS. 1 and 2, the conveying machine section 20a encompasses stations 1–6 inclusive which are separated from stations 8–15 inclusive of section 20b by a rack return station 7 at which an empty work rack 32 is suspended. Similarly, the treating receptacles 30 of section 20b are separated from the treating receptacles 30 comprising stations 17–22 and the unload station 23 of conveying machine section 20c by a rack return station 16. Station 1 of machine section 20a comprises the load station at which the workpieces are mounted on a suitable empty work rack or to which loaded work racks are transferred from the shop conveyor 22. Station 23 comprises an unload station from which the processed workpieces are removed from the work rack or from which the processed work rack is transferred to the unload shop conveyor 26 by a suitable unload mechanism.

The transfer movements of the shuttle carriages 28a, 28b, 28c overlap the adjoining ends of the adjacent machine sections such that, for example, the shuttle carriage 28b is operative to withdraw a loaded work rack 24 from station 6 of the machine section 20a and transfer it to a preselected treating receptacle 30 along the machine section 20b. Similarly, the shuttle carriage 28b can be controlled so as to deposit a work rack after the completion of its treatment in the treating receptacles comprising stations 8–15 inclusive, at station 17 corresponding to the first station of the conveying machine section 20c.

It has been conventional in the past during the transfer of work racks between adjoining machines to employ a so-called drain and transfer station at which work racks are placed for an indefinite time period after completing their processing sequence in one machine to await transfer to the next adjoining machine. Such drain and transfer stations in effect constitute hold-up stations which serve no useful treating function other than to provide an intermediate storage location of the work racks during their over-all processing cycle. Because of the close coordination between the transfer movements of the individual shuttle carriages of the shuttle conveying machine comprising the present invention, such space requirements associated with drain and transfer stations can now be eliminated whereby a transfer can be completed between one machine section to the next machine section utilizing an operative treating receptacle. Accordingly, it is now possible, if desired, to utilize a rinse tank or a solution recovery receptacle as a drain and transfer station providing for a decrease in the total length of the machine while simultaneously increasing the efficiency and decreasing the length of the processing cycle.

It is also possible, in accordance with the novel construction of the present machine, to transfer the empty work racks from the unload station to the same load end station of the machine by the shuttle carriages over the same processing path obviating the need of a separate rack conveyor which conventionally is required in straight-line machines of the type heretofore known. When relatively large and cumbersome work racks are employed for processing a particular type of workpiece, relatively elaborate and space-consuming rack conveyor systems are necessary which substantially increase the cost and space requirements of straight-line processing machines. While such a separate rack conveyor system can also be employed in the machine comprising the present invention, it is preferred to provide rack transfer stations such as stations 7 and 16 to which the empty work racks are transferred during their return cycle by the shuttle carriages toward the load end station of the machine. The inclusion of such a rack transfer cycle necessitates the provision of the rack return stations 7 and 16 which require little additional space and no additional conveying equipment providing a substantial decrease in the cost of an improvement in the utilization of plant space.

The particular arrangement shown in FIGS. 1 and 2 is applicable to an electroplating process wherein the loaded work racks 24 are conveyed through treating section 20a which may comprise, for example, a precleaning cycle after which they enter machine section 20b and undergo an electroplating cycle after which they are transferred to machine section 20c and undergo an after treatment cycle.

The loaded work racks 24 are supported at each treating station by a suitable rack support 34 mounted on beams 35 extending along each side of the treating receptacles 30 and disposed substantially centrally between the intervening partitions 36. Each of the shuttle carriages 28a, 28b, 28c is operable independently of each other and is effective to transfer the loaded work racks 24 in a preselected sequence through its respective conveying machine section. For example, the shuttle carriage 28a can be controlled so as to transfer the loaded work racks from the load station 1 through the treating receptacles to the treating station 6 in a successive sequentially phased operating cycle. The shuttle carriage 20b on the other hand, can be controlled so as to withdraw the loaded work rack from treating station 6 and place it in a selected one of the treating receptacles comprising stations 8–15 inclusive, providing thereby a cell-type operating cycle. The loaded work rack withdrawn by the shuttle carriage 28b can thereafter be transferred to station 17 of conveying machine section 20c from which it is transferred in a successive sequentially phased cycle through the after-treatment stations 17–22 to the unload station 23.

The structural features of the shuttle conveying machine will now be described with particular reference to FIGS. 3–7 which represent an enlarged view of conveying machine section 20b. Since each of the conveying machine sections 20a, 20b, 20c are substantially the same, a detailed description of one of these sections will furnish sufficient information for a complete understanding of the structural features of the entire straight-line machine. In the specific embodiment shown in FIGS. 3–7, the shuttle carriage 28b is movably mounted on a pair of longitudinally extending rails 38 disposed in spaced substantially parallel relationship and positioned adjacent to the upper edges of the treating receptacles 30. The shuttle carriage 28b is provided with two lift mechanisms 40a, 40b which are guidably supported by vertical frame members 42 for up and down movement over the treating receptacles 30.

The lower ends of the vertical frame members 42 are rigidly connected to longitudinal side members 44 to each of which a pair of flanged rollers 46 are rotatably secured. As best seen in FIGURE 5, the rollers 46 are disposed in rolling bearing contact between the upper and lower surfaces of the rails 38 which are of a channel-shaped configuration. The rails 38 are supported at appropriate longitudinal intervals by a series of columns 47 disposed at each side of the treating receptacles 30. The rails 38 may be comprised of a series of sections which can be securely fastened together in end-to-end abutting relationship to provide the desired length in accordance with the length and number of treating stations through which the workpieces are to be processed. The rails 38 conventionally extend continuously from one machine section to the next machine section to enable overlapping longitudinal movement of the individual shuttle carriages.

Each of the lift mechanisms 40a, 40b comprises a lift member 48a, 48b having the ends thereof slidably disposed in guided relationship within the vertical frame members 42 which are of a general channel-shaped cross-section. Each of the lift members 48a, 48b is provided with a pair of engaging arms 50a, 50b, respectively, which project inwardly in spaced opposed relationship and are formed with a general V-shaped slot or groove in which the end portions of the upper transverse bar of the work racks are adapted to be cradled while suspended from the lift mechanisms. Each of the lift members 48a, 48b is movable to and from a raised position as shown in FIG. 5 wherein the work racks are elevated above the partitions 36 of the treating receptacles to a lowered position wherein the engaging arms 50a, 50b are disposed below the rack supports 34.

As best shown in FIGS. 5 and 6, a suitable chain hoist mechanism is employed for vertically and independently moving each of the lift members 48a, 48b. Each of the hoist mechanisms comprises a reversible electric motor 52a, 52b which drivingly coupled to a suitable gear reducer 54a, 54b, respectively, which is provided with a drive sprocket 56a, 56b affixed to an output shaft 58a, 58b thereof. The drive sprocket 56a, 56b is drivingly connected by an endless chain 60a, 60b to a driven sprocket 62a, 62b which in turn is fixedly secured on a drum shaft 64a, 64b rotatably journaled in a pair of upper frame members 66 of the shuttle carriage. A pair of transversely spaced flexible elements such as chains 68a, 68b are wound around the drum shafts 64a, 64b, respectively, and have their lower ends affixed to the upper cross members of the lift members 48a, 48b. Each of the reversible electric motors 52a, 52b is independently operable providing for independent lifting and lowering of the lift mechanisms 40a, 40b. It is also contemplated within the scope of the present invention that alternate suitable mechanisms can be satisfactorily employed such as a hydraulic cylinder or a rack and pinion arrangement, for example, to achieve independent vertical movement of the two lift members 48a, 48b.

The proper vertical movement of each of the lift members 48a, 48b is controlled by an up-position limit switch LS1a, LS1b and a lower-position limit switch LS2a, LS2b which are mounted adjacent to the vertical frame members 42 as best shown in FIGURES 5 and 6 and are actuable by the lift members 48a, 48b respectively. The limit switches are electrically connected to the central control system supplying electrical energy to the reversible electric motors 52a, 52b effecting a de-energization thereof when the lift members have attained the appropriate raised or lowered position and simultaneously communicating that condition to the control system.

Electrical energy is supplied to each of the reversible electric motors 52a, 52b by three longitudinally extending conductor rails 70a, 70b affixed to the outer surface of each of the supporting rails 38 against which a corresponding number of contact brushes 72a, 72b are disposed in electrical sliding contact. A magnified illustration of the conductor rails 70a is shown in FIG. 7 which encompasses the area encircled within the dotted circle indicated at 7 in FIG. 5. As shown in FIG. 7, the contact brushes 72a which are electrically connected to the reversible electric motor 52a of the lift mechanism 40a are mounted in vertically spaced relationship on an extension bracket 74 projecting laterally of the longitudinal side member 44 of the shuttle carriage. Each of the contact brushes 72a is electrically connected to a junction box 76a from which electrical conductors extend upwardly along the vertical frame members 42 to the electric motor 52a. The contact brushes 72b are similarly mounted on an extension bracket 74b and are electrically connected to a junction box 76b as shown in FIG. 5, which in turn is connected by suitable conductors to the reversible electric motor 52b of the lift mechanism 40b.

It will be apparent from the arrangement hereinabove described that a reversal of the polarity in the conductor rails, 70a, 70b effects a corresponding reversal in the direction of rotation of the reversible electric motors providing the desired lifting or lowering movement of the lift members 48a, 48b. It will also be appreciated that a three-phase alternating current can be supplied to the reversible electric motors by suitable flexible cables supported from an overhead structure above the path of travel of each of the shuttle carriages in a manner as shown schematically in FIG. 1 or, alternatively, by suitable overhead electrified trolley wires extending longitudinally of the path of travel of the shuttle carriage. It will be further understood that in lieu of employing reversible electric motors for supplying motive power to the lift mechanisms 40a, 40b, suitable fluid-actuated motors can be employed to which a pressurized actuating fluid is supplied through flexible conduits provided with suitable remotely actuable solenoid valves for effecting energization and de-energization of the motors as well as controlling the direction of rotation thereof.

Longitudinal advancement of the shuttle carriage along the rails 38 can be achieved by a chain transfer mechanism as shown in FIGS. 3–5 which includes a reversible transfer motor 78 drivingly connected to a gear box 80 which is drivingly coupled to a drive sprocket 82 that is connected to a driven sprocket 84 by flexible element 86. The driven sprocket 84 is mounted on a drive shaft 88 which is rotatably supported on the end columns 47 and extends transversely of the rails 38. A reducer sprocket 90 is connected to each end of the drive shaft 88 around each of which a continuous transfer chain 92 is trained having the opposite end thereof trained around an idler sprocket 94 affixed to each of the ends of an idler shaft 96 rotatably mounted on the columns 47. The upper flight of each of the transfer chains 92 is connected at one of the links thereof to a side arm 98 affixed to and projecting laterally of each of the side members 44 of the shuttle carriage effecting movement thereof responsive to the longitudinal travel of the chain. The provision of a transfer chain 92 on each side of the conveying machine effects an equalization of the forces applied to the shuttle carriage preventing any binding or skewing thereof during its movement along the rails 38.

Energization and de-energization of the reversible transfer motor 78 is controlled so as to align the appropriate engaging arms 50a, 50b of the lift members 48a, 48b, respectively, with rack supports 34 at a particular treating station. This alignment is achieved in the exemplary machine shown in FIGS. 4 and 5 by a series of station limit switches LS3a, LS3b disposed in longitudinally spaced increments along the rails 38 which are adapted to be actuated by actuators 100a, 100b, respectively, on the shuttle carriage for halting the travel thereof when the lift mechanisms 40a, 40b respectively, are disposed in appropriate vertical alignment with the rack supports 34 of a selected treating station. Alternate suitable sensing means such as magnetic or photoelectric sensors, for example, can also be satisfactorily employed which can be selectively energized to halt the shuttle carriage with one of the lift mechanisms 40a, 40b disposed in vertical alignment relative to a preselected treating station.

Each of the station limit switches LS3a, LS3b is electrically connected to the central control circuit of the conveying machine and is selectively energized so that upon actuation thereof by the actuators 100a, 100b, the carriage halts in the appropriate position. The actuation of the station limit switches which are de-energized has no effect on the shuttle carriage transfer movement. The actuation of the station limit switches also communicates the arrival of the shuttle carriage to the selected treating station, whereupon the movement of the appropriate lift mechanism is initiated to either lift or lower the work carrier out of or into that treating station. At the completion of the lifting or lowering movement of the lift mechanisms as signaled by the appropriate up position or down position limit switches LS1a, LS1b, or LS2a, LS2b, the transfer motor is again energized, effecting longitudinal travel of the shuttle carriage until the appropriate actuator 100a, 100b trips another station limit which has been energized by the central control system effecting a stopping of the carriage at that treating station location. The foregoing operating cycle and coordination of the several control limit switches will be described in greater detail in a later portion of the specification in connection with typical operating sequences of the shuttle carriage and the lift mechanisms thereon.

An alternate satisfactory construction of the shuttle carriage is illustrated in FIG. 8 wherein like parts are designated with the same number previously employed in connection with the machine illustrated in FIGS. 1–7 with a prime affixed thereto. As shown in FIG. 8, the vertical frame members 42′ are elongated and extend downwardly along the sides of the treating receptacles 30′ and are provided with rollers 46′ at the lower ends thereof disposed in rolling guided relationship in longitudinally extending rails 38′ mounted on the floor or common platform on which the treating receptacles are mounted. This structural arrangement reduces the supporting framework and colums required in the machine structure previously described for supporting the rails in an elevated position adjacent to the upper edges of the treating receptacles. In other respects the shuttle carriage is substantially the same as that hereinabove described.

Still another satisfactory construction of a shuttle carriage and rail support is illustrated in FIGS. 9 and 10. As shown in these drawings, an overhead monorail 102 is suspended by a series of braces 104 from an overhead supporting structure. The monorail 102 extends longitudinally and substantially centrally above a plurality of treating receptacles 106 which are provided with rack supports 108 along the upper edges thereof on which a work rack 110 is suspended when the rack is immersed in the treating receptacle. A shuttle carriage is movably mounted on the monorail 102 and comprises a plurality of single lift shuttles 112 which are adapted to be removably coupled to each other forming therewith a multiple lift carriage consistent with the particular type of processing cycle to be performed.

Each of the shuttles 112 comprises a trolley 114 from which an inverted U-shaped frame is suspended comprising a pair of upright side members 116 of a channel-shaped cross section which are rigidly secured at the upper ends thereof to a transverse member 118. A lift member 120 is slidably disposed and guided by the coaction of the side portions thereof within the side members 116 for up and down movement over the treating receptacles effecting a withdrawal or a lowering of the work racks therein. The lift members 120 are identical to those hereinbefore described and are formed with engaging arms 122 at the lower ends thereof for engaging and cradling the work racks suspended therefrom. Vertical up and down movement of each of the lift members 120 is achieved by a suitable hoist mechanism comprising a reversible motor 124 mounted on the transverse member 118 which is drivingly coupled to a drum shaft 126 for winding or unwinding a pair of lift cables or chains 128 which have the lower ends thereof connected to the lift members 120.

The trolley 114 comprises a member 129 which is of a general U-shaped cross section and on which four spaced pairs of rollers 130 are mounted in rolling bearing contact against opposite surfaces of the lower flange of the monorail 102 as best seen in FIG. 10. A pair of upper rollers 132 are also provided which are disposed in rolling bearing contact against opposite surfaces of the vertical flange of the monorail to prevent lateral swinging movement of the shuttle framework relative to the treating receptacles. Longitudinal movement of the shuttle 112 is achieved by a suitable drive mechanism such as a rack and pinion drive arrangement comprising an elongated rack 134 affixed to the underside of the monorail and extending centrally and longitudinally thereof. A pinion 136 is rotatably mounted on the trolley 114 and is disposed in constant meshing relationship with the rack 134. Rotation of the pinion 136 in either direction is achieved by a reversible motor 138 mounted on the underside of the trolley 114 which is drivingly coupled to the pinion by means of a bevel gear transmission indicated at 140.

Electrification of the reversible motor 124 of the shuttle lift mechanism and the reversible motor 138 of the transfer mechanism can suitably be achieved by flexible cable conductors extending downwardly from the overhead supporting structure in a manner as previously described or alternatively by a series of trolley conductors 142a, 142b, 142c extending longitudinally of the path of travel of the shuttle which are disposed in sliding electrical contact with contact brush assemblies 144a, 144b, 144c, respectively, mounted on the trolley and disposed in electrical connection with the appropriate electrical motor.

In the particular construction of the single lift shuttles 112 as shown in FIGS. 9 and 10, each shuttle is provided with its own transfer mechanism. Since only one transfer mechanism is required to propel two or more of the single lift shuttles 112 coupled to each other by upper links 146 and lower links 148 as shown in FIG. 9, the remaining transfer mechanisms may either be eliminated or deactivated so that one shuttle acts as the master and the remaining shuttles connected thereto serve as slave units. By virtue of the coupling arrangement provided, a multiple lift shuttle carriage can readily be constructed incorporating two or more individual shuttles to provide the necessary lift mechanisms to achieve the requisite work handling capacity of the work racks along any particular machine section. Additionally, by varying the length of the connecting links 146, 148, the longitudinal spacing between the lift mechanisms of each of the shuttles can be varied and adjusted, if desired, to accommodate the spacings between the rack supports 108 of the treating stations along that machine section.

The lifting and lowering movement of the lift member 120 of each of the shuttles is controlled in a manner previously described by an up position limit switch LS1 and a lower position limit switch LS2 mounted on the side members 116 and actuable responsive to the ascending and descending movement of the lift member 120. Similarly, the proper longitudinal movement of the shuttle carriage comprising a plurality of the single shuttles is controlled by suitable sensing means such as station limit switches LS3 affixed to the vertical web of the monorail and adapted to be tripped by actuators 150a, 150b, etc., mounted on each shuttle, respectively, for halting the shuttle carriage when the lift mechanism of a particular shuttle is positioned in alignment with the rack supports 108 at a specific treating station.

The conveying machine hereinbefore described is illustrated in the form of a straight-line machine wherein one or a plurality of shuttle carriages were operative to transfer a plurality of loaded work racks in sequentially phased sequence through an aligned series of treating stations. It is also contemplated within the scope of the present invention that an alternate arrangement of the treating receptacles can be made along which one or a plurality of shuttle carriages are movably disposed for providing the requisite treating cycle consistent with a particular plant layout and work flow pattern. A specific example of an alternate arrangement of the treating receptacles as illustrated in FIG. 11 wherein a shuttle carriage of the general type shown in FIGS. 3–7 is illustrated which is adapted to transfer workpieces from a row of treating receptacles 30 to a second row of treating receptacles disposed adjacent thereto. In the specific arrangement shown, the transfer of the work racks from the output end of one row of treating receptacles to the input end of a second row of treating receptacles provides for a work flow pattern of the so-called turn-around type in which the workpieces are conveyed in a continuous loop pattern. The turn-around machine as fragmentarily illustrated in FIG. 11 constitutes two straight-line machines interconnected at the ends thereof by a square transfer section along which the shuttle carriages are transferred from one section to the next adjacent section.

In the exemplary arrangement shown in FIG. 11, a dual lift shuttle carriage 28 is shown in solid lines positioned on the supporting rails 38 beyond the last station of an aligned series of treating receptacles 30. The shuttle carriage 28 in the particular position shown is disposed on a square transfer mechanism which is movable to and from a lowered position as shown in solid lines to a raised position vertically spaced thereabove. The square transfer-mechanism comprises a framework 151 having a pair of transfer rails 152 mounted along the upper portions thereof and extending in spaced, substantially parallel relationship. The transfer rails 152 are adapted to fit in appropriate gaps 154 in the principal rails 38 and in alignment with the upper surfaces thereof so that a continuous rolling surface is provided for the rollers 156 on the shuttle carriage. The shuttle carriage is provided with a second set of auxiliary rollers 158 extending from the lower side members 44 thereof which are adapted to be disposed in contact with the transfer rails 152 when the transfer rails are rasied to an elevated position above the principal rails 38.

Movement of the framework 151 and the transfer rails 152 thereon to and from a raised position and a lowered position can be suitably achieved such as, for example, by a series of fluid-actuated cylinders 160 mounted on the floor or suitable supporting platform having the rod end thereof connected to the framework 151. A series of suitable telescopic columns 162 are preferably provided for stabilizing the framework while in the lowered and raised position, as well as during its movement therebetween. Lateral transfer of the shuttle carriage along the transfer rails 152 from the position shown in solid lines in FIG. 11 to the position shown in phantom can be achieved by an advancing mechanism comprising a continuous chain 164 trained around a pair of sprockets 166 which are drivingly connected to a reversible motor 168 mounted in the framework 151. The transfer chain 164 incorporates a pusher dog 170 which is adapted to contact the shuttle carriage and effect a transfer thereof along the transfer rails. The transfer movement of the shuttle carriage is halted as communicated by a suitable transfer limit switch LS4 when the shuttle carriage has been transferred to a position wherein the principal rollers 156 thereon are disposed in alignment with the principal supporting rails 38 of the next adjacent conveying section.

In operation, the co-ordination of the transfer mechanism and the work rack conveying sequence of the shuttle carriage can be simply achieved whereby when the shuttle carriage has completed its rack transfer movements along one machine section, it is advanced with one or a plurality of work racks suspended therefrom beyond the last treating station to the position as shown in solid lines of FIG. 11. When the shuttle carriage attains that position as signaled by a station limit switch, the advancing movement of the shuttle carriage is halted and the transfer chain motor 168 is energized. Accordingly, the shuttle carriage and the work racks supported therefrom are laterally transferred to the position shown in phantom from which the shuttle carriage is advanced over the treating receptacles 30, and the work racks thereon are thereafter deposited in the first or selected stations of the second adjacent treating machine.

The shuttle carriage may be employed exclusively for transferring work racks from the last or the last few treating stations of one machine section to the first or first few treating stations of the adjacent treating section or, alternatively, can be employed for effecting sequential transfer of the work racks through a portion of the aligned row of treating receptacles in addition to a transfer of racks between the adjacent machine sections. It is also contemplated that one or more treating receptacles can be incorporated along the transfer rails 152 in which the work racks can be lowered by the lift mechanism on the shuttle carriage at a point intermediate the two adjacent treating machine sections.

Figure 12:
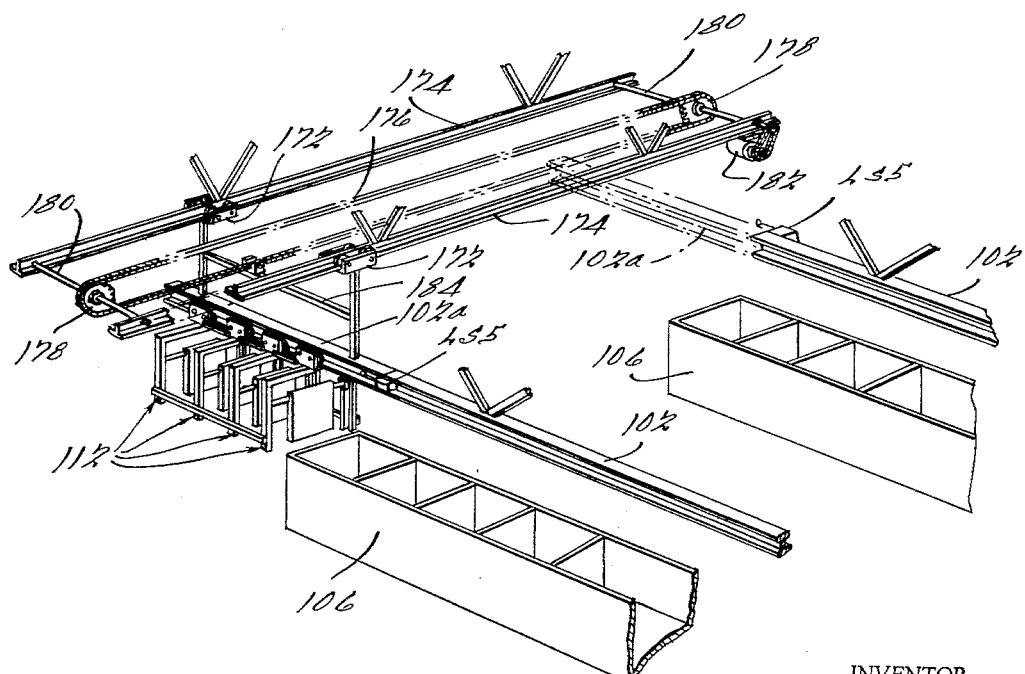
FIG. 12 is a fragmentary, perspective view of an alternate satisfactory lateral end transfer arrangement for a plurality of interconnected single lift shuttles supported from an overhead monorail.

An alternate satisfactory square transfer mechanism is illustrated in FIG. 12 which is particularly applicable to a shuttle carriage of the general type shown in FIGS. 9 and 10 wherein the carriage is supported from an overhead monorail 102. In the specific shuttle carriage shown, four shuttles 112 are removably coupled together forming a shuttle carriage having four independently operable lift mechanisms to achieve a desired work rack handling sequence. As shown in FIG. 12, two aligned rows of treating receptacles 106 are disposed in spaced, substantially parallel relationship above which the monorail 102 extends. The ends of the monorails 102 are adapted to be disposed in end-to-end alignment with a laterally movable monorail section 102a which is movably supported by a series of trolleys 172 movably supported from lateral transfer rails 174.

In accordance with the arrangement shown, the shuttle carriage after completing a prescribed transfer cycle of the work racks along the first row of treating receptacles, is advanced to the position as shown in solid lines in FIG. 12 on the monorail section 102a which thereafter is laterally transferred to the position shown in phantom in alignment with the monorail 102 above the second row of treating receptacles. The lateral transfer movement of the monorail section 102a can suitably be achieved by a transfer mechanism comprising a continuous chain 176 trained around a pair of sprockets 178 rotatably supported on shafts 180 extending between the transfer rails 174. A reversible drive motor 182 is drivingly coupled to one of the shafts 180 for effecting longitudinal movement of the transfer chain 176. The lower flight of the transfer chain 176 is connected at one link thereof to a transverse member 184 extending between and affixed to the trolley supports for suspending the monorail section 102. The lateral movement of the monorail section 102 between an aligned position with one of the principal monorails 102 to an aligned position with the end of the other monorail 102 can be satisfactorily controlled by suitable sensing means such as limit switches LS5 actuable when the monorail section attains the appropriate aligned position.

It is also contemplated within the scope of the present invention that the square transfer mechanisms hereinabove described, and as illustrated in FIGS. 11 and 12, can be employed at selected points along the principal supporting rails for withdrawing a shuttle carriage from its conventional path of travel to a point laterally spaced therefrom either to enable substitution of shuttle carriages for periodic maintenance or to provide for an alternate treating sequence of the work racks suspended therefrom. The inherent flexibility of the operating characteristics of the shuttle carriages herein described, further combined with the flexibility provided by the inclusion of one or more square transfer mechanisms provide for an exceptionally high degree of versatility in the handling and processing of workpieces.

The versatility and processing flexibility provided by the shuttle conveying machine structure hereinbefore described can best be illustrated with reference to the schematic sequence drawings comprising FIGS. 13A–18C inclusive. One specific type of operating sequence is schematically illustrated in FIGS. 13A–13D in which a dual lift shuttle carriage is employed for sequentially advancing the loaded work racks in sequence from one station to the next adjoining station. In the exemplary treating sequence illustrated, a load station designated station No. 1 is provided on which work racks are transferred either from an adjoining treating section by a similar shuttle carriage or from a suitable shop conveyor. Similarly, an unloading station corresponding to station No. 8 is provided to which the loaded work racks are transferred at the completion of their treating cycle through a plurality of treating receptacles comprising stations 2–7. The unloading station may correspond to the first station of the next adjoining treating machine or, alternatively, may comprise a shop conveyor from which the loaded work racks are transferred to the next manufacturing operation. The particular sequence and treating receptacle arrangement illustrated in FIGS. 13A–13D is typical of one employed either for the pretreatment or after treatment of the workpieces before or after an intervening electroplating operation.

The transfer cycle is initiated from the unload end of the machine and progresses toward the load end thereof whereby the shuttle carriage 28 is initially positioned such that the lift mechanisms 40a, 40b are in the lowered position and in alignment with the loaded work racks f and g, respectively, immersed in the last two treating stations 6 and 7. In this position, the lift mechanisms 40a, 40b are energized whereby the loaded work racks f and g are raised from the lowered position as shown in solid lines in FIG. 13A to the raised position as shown in phantom. When the lift mechanisms 40a, 40b attain the fully elevated position as indicated by up position lift limit switches, the shuttle carriage is advanced one station from the position shown in FIG. 13A to the position shown in 13B in which the elevated work racks are disposed in vertical alignment with the rack supports of stations 7 and 8. When the shuttle carriage attains the appropriate positions as signaled by the tripping of the station limit switch, the lift mechanisms 40a, 40b are energized effecting a lowering of the loaded work racks from the position shown in solid lines in FIG. 13B to the position shown in phantom.

Figure 13A:
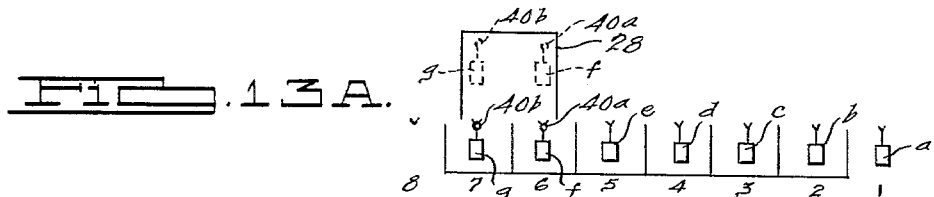
FIGS. 13A–13D are schematic side elevation views illustrating the operation of the shuttle carriage and the lift mechanisms thereon for providing a single station advance double-lift operation for sequentially advancing the work racks through a series of treating receptacles.
Figure 13B:
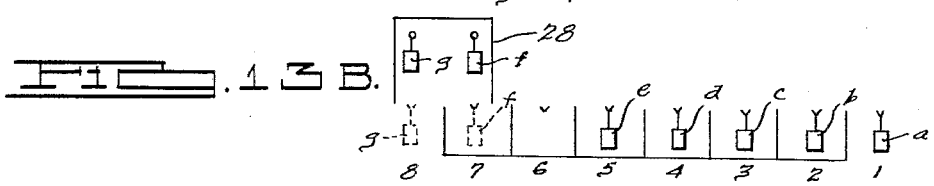
Figure 13C:
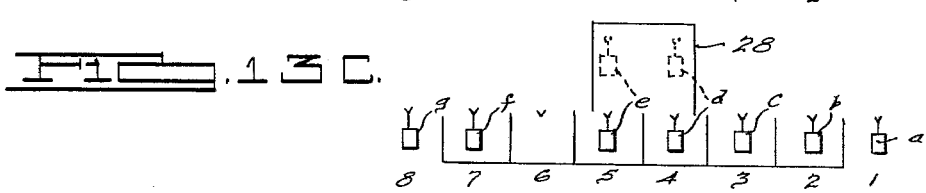
Figure 13D:
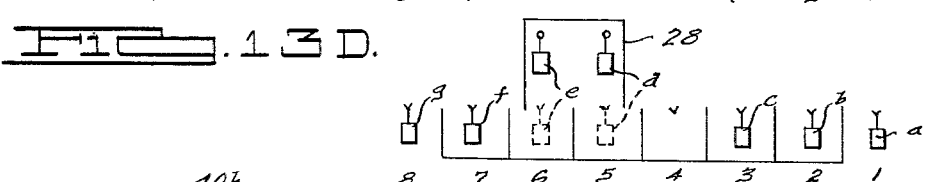

When the lift mechanisms' down position limit switches are actuated, signaling that the loaded work racks f and g have been deposited at stations 7 and 8, the shuttle transfer mechanism is energized effecting an advance of the shuttle carriage from the position shown in FIG. 13B to the position shown in 13C. When the station limit switch is tripped by the shuttle carriage, the shuttle transfer mechanism is de-energized and the lift mechanisms 40a, 40b are energized effecting a lifting of the loaded work racks d and e from the position in stations 4 and 5 shown in solid line in FIG. 13C to an elevated position as shown in phantom. When the up position limit switches are actuated, signaling the central control system that the work racks have been lifted to a clearance position above the treating receptacles, the shuttle carriage transfer mechanism is again energized, whereupon the carriage is moved from the position shown in FIG. 13C to the position shown in FIG. 13D. When the shuttle carriage has been advanced one station, the appropriation station limit switch is actuated de-energizing the shuttle carriage transfer mechanism after which the lift mechanisms 40a, 40b are energized, effecting a lowering of the loaded work racks d and e from the raised position as shown in solid lines downwardly into the treating receptacles at stations 5 and 6, respectively, to the position as shown in phantom in FIG. 13D.

The foregoing cycle is again repeated whereby the loaded work racks b and c are advanced from stations 2 and 3, respectively, to stations 3 and 4 followed thereafter by the transfer of the loaded work rack a from the load end station 1 to the first treating receptacle at station 2. The loaded work rack g at station 8 which has completed its treating cycle through the treating receptacles is removed either by a corresponding shuttle mechanism of the next adjacent conveying machine section or by a shop conveyor whereupon the shuttle carriage is again advanved to the position shown in FIG. 13A for effecting a transfer of the work racks e and f at stations 6 and 7, respectively, to stations 7 and 8, respectively.

In the foregoing operating sequence, it is assumed that the longitudinal spacing between the work rack supports at the treating stations 1–8 are substantially equal and corresponding to the longitudinal spacing between the left mechanisms 40a, 40b. Under these conditions, both of the lift mechanisms 40a, 40b are simultaneously aligned with the treating station therebelow, enabling simultaneous lifting or lowering of both of the adjoining work racks. In many instances, however, the width of the individual treating receptacles will vary, causing a corresponding variation in the spacing between the work rack supports. Under such circumstances the operating cycle previously described in connection with FIGS. 13A–D is modified to the extent that the shuttle carriage is transferred to a first position wherein the lift mechanism 40a is aligned with a work rack which is thereafter lifted and then the shuttle carriage is transferred slightly so as to align the lift mechanism 40b with the work rack in the next adjacent treating receptacle.

The lift mechanism 40b is thereafter elevated, resulting in a condition similar to that shown in FIG. 13A, after which the shuttle carriage is advanced to a position as shown in FIG. 13B wherein the lift mechanism 40a is in alignment with the rack supports of station 7. In this position the left mechanism 40a is lowered, depositing the rack f at station 7, and thereafter the shuttle carriage is transferred so as to align the lift mechanism 40b with the rack support at station 8. When this position is attained, the lift mechanism 40b is lowered, depositing the work rack g from the raised position to the lowered position as shown in phantom in FIG. 13B. It will be appreciated from the foregoing that the basic cycle is the same as that previously described with the exception that the lift mechanisms 40a, 40b are actuated individually separated by an intervening alignment transfer of the shuttle carriage to compensate for the deviation in the spacing between the rack supports of adjacent treating stations and the longitudinal spacing of the lift mechanisms.

Another automatic operating sequence of the shuttle carriage is illustrated in FIGS. 14A–D which provides for the sequential transfer of the loaded work racks in pairs successively through a series of paired treating stations commencing at the unload end of the machine and progressing towards the load end thereof. The loaded work racks a and b are supported from the work rack supports at stations 1 and 2 comprising the load end section of the machine and the processed racks after completion of their treatment in the treating receptacles comprising stations 3–8 are finally deposited at unload stations 9 and 10. The load stations 1 and 2 and the unload stations 9 and 10 may suitably comprise shop conveyors or drain and transfer stations between adjoining conveying machine providing for an integrated over-all operating cycle.

The operating cycle as schematically illustrated in FIGS. 14A–D commences with the shuttle carriage having the lift mechanisms 40a, 40b positioned in the lowered position and in vertical alignment with loaded work racks g and h in stations 7 and 8, respectively. In this position, the lift mechanisms 40a, 40b are energized, effecting the withdrawal of the work racks g and h from the treating receptacles from a lowered position as shown in solid lines in FIG. 14A to a raised position as shown in phantom. When the lift mechanisms 40a, 40b attain the fully elevated position, up position limit switches are actuated thereby whereupon the shuttle carriage transfer mechanism is energized, advancing the shuttle carriage from the position shown in FIG. 14A to the position shown in 14B. When the shuttle carriage attains the appropriate aligned position above stations 9 and 10, as signaled by the actuation of a station limit switch, the lift mechanisms 40a, 40b are energized, effecting a lowering of the work racks g and h from the position as shown in solid lines in FIG. 14B to the position shown in phantom. At the completion of the lowering movement of the lift mechanism, down position lift limit switches are actuated, whereupon the carriage transfer mechanism is energized, effecting movement of the shuttle carriage from the position in FIG. 14B to the position shown in 14C in which the lift mechanisms 40a, 40b are disposed in vertical alignment beneath the work racks e and f at stations 5 and 6, respectively.

Figure 14A:
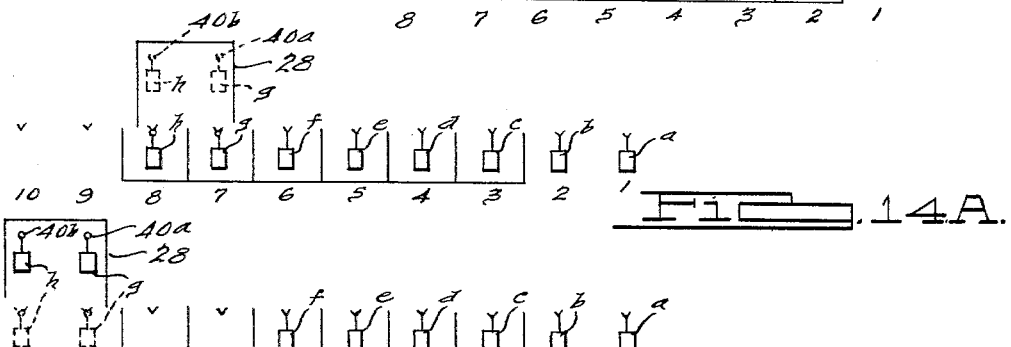
FIG. 14A–14D are schematic side elevation views of the shuttle conveying machine illustrating the operation of the shuttle carriage and the lift mechanisms thereon for providing a double-lift two-station advance of the work racks sequentially through a series of aligned treating receptacles.
Figure 14B:
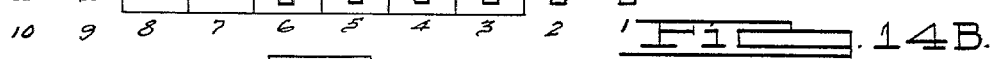
Figure 14C:
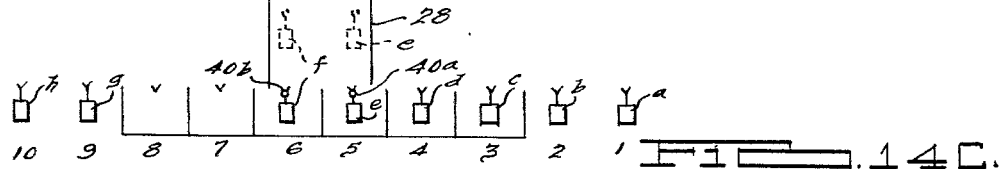
Figure 14D:
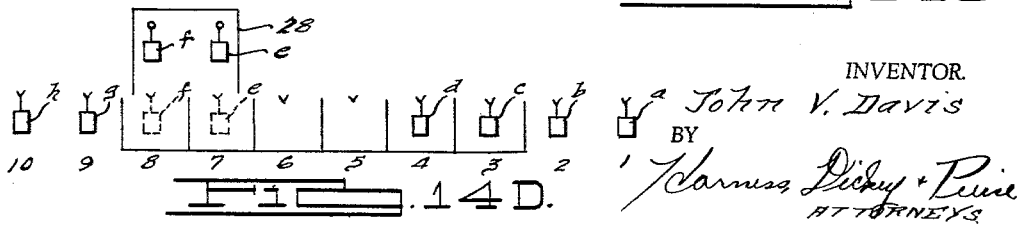

The lift mechanism 40a, 40b are thereafter energized, effecting elevation of the loaded work racks e and f from the position shown in solid lines in FIG. 14C to the raised position as shown in phantom. At the completion of the elevating movement, the shuttle carriage is advanced from the position shown in FIG. 14C to the position shown in 14D above the treating stations 7 and 8. When this position is attained as signaled by the tripping of a station limit switch, the lift mechanisms are again energized, effecting a lowering of the work racks e and f into the treating receptacles at stations 7 and 8, respectively, which were previously vacated by the removal of the work racks g and h.

The foregoing operating sequence continues whereby the work racks c and d are transferred from stations 3 and 4, respectively, to stations 5 and 6, respectively. Thereafter the work racks a and b at loading stations 1 and 2 are transferred to treating stations 3 and 4, respectively. At the completion of the transfer of work racks a and b, the shuttle carriage is transferred to the position shown in FIG. 14A, whereby the work racks e and f are removed from the treating receptacles at stations 7 and 8 and are placed at unload stations 9 and 10, respectively, which, during the interim have been cleared of work racks g and h previously transferred thereto.

The foregoing double-lift, double-station advance operating cycle has been described for the situation where the longitudinal spacing between the work rack supports is substantially equal and corresponds to the longitudinal spacing between the lift mechanisms 40a, 40b on the shuttle carriage. Under conditions where the longitudinal spacing between the rack supports of adjoining treating stations is dissimilar, operation of the lift mechanisms is accomplished independently with an intervening aligning movement of the shuttle carriage to effect alignment of the lift mechanism 40b after the lift mechanism 40a has been raised or lowered. The operating cycle of the machine is otherwise unchanged, effecting the lifting of two loaded work racks in adjacent treating receptacles and the transfer thereof in unison to the next adjoining pair of treating receptacles.

The sequential transfer of loaded work racks from one treating station to the next adjoining treating station in accordance with the cycle illustrated in FIGS. 14A–D and 13A–D was initiated by the shuttle carriage starting at the unload or exit end of the treating receptacles and moving toward the load end of the machine. An alternate satisfactory sequential transfer of work racks from one station to the next adjoining treating station is illustrated in FIGS. 15A–H employing a so-called "shuttle cycle" commencing at the load end station of the machine and progressing therefrom toward the unload station thereof.

As shown in FIG. 15A, the shuttle cycle commences with the shuttle carriage 28 positioned with the lift mechanism 40a thereon disposed in the lowered position and in vertical alignment beneath a loaded work rack a supported at load station 1. The load station 1 may comprise a drain and transfer station between the machine section illustrated in FIG. 15A–H and a preceding station or alternatively may comprise a load position of a shop conveyor for supplying loaded work racks to be processed. The cycle is initiated by the energization of the lift mechanism 40a which effects movement of the work rack a from the lowered position as shown in solid lines to the raised position as shown in phantom in FIG. 15A. When the lift mechanism 40a attains the elevated position as signaled by up position lift limit switch, the shuttle carriage is advanced from the position shown in FIG. 15A to the position shown in FIG. 15B wherein the lift mechanism 40b is positioned beneath and in vertical alignment with a work rack b positioned in station 2 of a series of aligned treating receptacles. When the shuttle carriage attains the aligned positions as signaled by a station limit switch, the lift mechanism 40b is energized, effecting a withdrawal of the work rack b from the lowered position as shown in solid lines in FIG. 15B to the raised position shown in phantom. When the lift mechanism 40b attains the raised position as signaled by up position lift limit switch, the transfer mechanism of the shuttle carriage is energized, effecting movement of the shuttle carriage from the position shown in FIG. 15B to the position shown in 15C wherein the work rack a supported in the elevated position by the lift mechanism 40a is aligned with the rack supports of the treating receptacle at station 2. When this position is attained by the shuttle carriage as communicated to the central control system by station limit switch, the lift mechanism 40a is energized, effecting a lowering of the loaded work rack *a* from the position shown in solid lines in FIG. 15C to the lowered position as shown in phantom.

At the completion of the lowering movement, the shuttle carriage 28 is transferred wherein the lift mechanism 40a is disposed beneath and in vertical alignment with a work rack *c* immersed at station 3 which is withdrawn thereby from the position shown in solid lines in FIG. 15D to the raised position shown in phantom. At the completion of the elevating movement of the lift mechanism 40a, the shuttle carriage is transferred from the position shown in FIG. 15D to the position shown in FIG. 15E wherein the work rack *b* supported on the lift mechanism 40b is disposed in vertical alignment above the rack supports of station 3. When this position is attained, the lift mechanism 40b is lowered, depositing the work rack *b* on the rack supports as shown in phantom in FIG. 15E, thereby replacing the position previously vacated on the withdrawal of the work rack *c*.

The shuttle carriage is thereafter transferred from the position shown in FIG. 15E to the position shown in FIG. 15F wherein the lift mechanism 40b is disposed beneath and in vertical alignment with a loaded rack *d* at station 4. When this position is attained, the lift mechanism 40b is energized, effecting a withdrawal of the rack *b* to the position shown in phantom. The shuttle carriage thereafter is advanced, placing the work rack *c* in vertical alignment above vacated station 4 after which the rack *c* is deposited in the treating receptacle at station 4 as shown in phantom in FIG. 15G.

In accordance with this shuttle sequence, the work racks are progressively withdrawn and replaced by the work racks in the preceding station until, as shown in FIG. 15H, the last work rack *g* formerly in station 7 is deposited on unload station 8 by the lift mechanism 40a. A new loaded work rack *a'* is transferred to load station 1 and is removed therefrom upon transfer of the shuttle carriage from the position shown in FIG. 15H to the position shown in 15A after which the cycle hereinabove described is repeated. It will be observed that the foregoing shuttle cycle was described for the condition in which the longitudinal spacing between the work racks in adjacent treating stations was irregular and did not correspond to the longitudinal spacing between the lift mechanisms 40a, 40b. In the condition where the rack spacings are equal and correspond to the spacing between the lift mechanisms 40a, 40b, the intervening aligning movement of the shuttle carriage is unnecessary such that, for example, referring to FIG. 15A and 15B, the work racks *a* and *b* are simultaneously elevated from the positions shown in solid lines in FIG. 15A to the raised positions illustrated in FIG. 15B. The shuttle carriage thereafter is advanced to the position shown in 15C; the rack *a* is lowered and the shuttle carriage is advanced to position illustrated in FIG. 15D. The forward and reverse shuttle action of the shuttle carriage thereafter continues in a manner as previously described.

Still another satisfactory operating cycle of the shuttle type conveying machine comprising the present invention is schematically illustrated in FIGS. 16A–G. The operating sequence as illustrated in these figures is of a so-called cell operating cycle which is particularly applicable for the electroplating of workpieces in so-called plating cells employing nested anodes which prevent longitudinal advancement of the work carriers while in the lowered position. In accordance with such a cell-type plating operation, a work rack is transferred to a selective cell station and immersed therein for a predetermined treating period after which it is withdrawn and advanced to an output or unload station beyond the plating station. This sequence accordingly requires selectivity as to from which station or cell a work rack is to be withdrawn and in turn replaced by a work rack having untreated workpieces thereon.

Conventionally, the cell plating section 20b is interposed between a pretreatment section 20a such as a precleaning treating series and an after-treatment section 20c in a manner as previously described in connection with FIGS. 1 and 2. Each section is served by a shuttle carriage 28a, 28b, 28c, respectively, of the general type hereinbefore described. The cell-type operating cycle illustrated in FIGS. 16A–G further illustrates a rack return cycle whereby the work racks, after being advanced through the entire treating sequence, are returned by the shuttle carriages for reloading with new workpieces to be processed at the load station adjacent to the first station of the treating cycle. By virtue of this rack-return operating sequence, a separate conveyor for returning the empty work racks from the unload end of the machine to the load end of the machine can be dispensed with providing for substantial savings in equipment and plant space. The empty work racks being returned are transferred in a direction opposite to the loaded work racks being processed and are stored between adjacent machine sections at work rack return stations such as stations 2 and 9.

A typical cell-type operating cycle will now be described commencing with the shuttle carriage 28b disposed in a position as illustrated in FIG. 16A wherein the lift mechanism 40a is disposed below and in vertical alignment with a loaded work rack *b* disposed in a drain and transfer station 1 of the preceding machine section 20a such as a precleaning operation. In this position, the lift mechanism 40a is energized, effecting a withdrawal of the work rack *b* from the lowered position as shown in solid lines in FIG. 16A to the raised position as shown in phantom. At the completion of the elevating movement of the lift mechanism 40a, the shuttle carriage 28b is advanced from the position of FIG. 16A to the position shown in FIG. 16B over a cell in which the workpieces on the loaded rack immersed therein have completed a prescribed treatment or plating time in the electroplating cell.

In the particular sequence illustrated, cell 2, corresponding to station 4, is next to be serviced, whereby the lift mechanism 40b is positioned below and in vertical alignment with a work rack *e*. The lift mechanism 40b is thereafter energized, effecting a withdrawal of the work rack *e* from the lower position as shown in solid lines in FIG. 16B to the raised position as shown in phantom. The shuttle carriage thereafter is advanced from the position shown in FIG. 16B to the position shown in FIG. 16C, whereby the new work rack *b* is disposed in vertical alignment above the rack supports of station 4. In this position, the lift mechanism 40a is energized, effecting an immersion of the loaded work rack *b* into cell 2 of the treating receptacles corresponding to station 4. At the completion of the lowering movement of the work rack *b*, the shuttle carriage containing the work rack *e*, including the completed workpieces thereon, is advanced from the position shown in FIG. 16C to the position shown in FIG. 16D. The work rack *b* is thereafter lowered by the lift mechanism 40b from the raised position as shown in solid lines to the lowered position as shown in phantom in FIG. 16D.

Referring now back to FIG. 16A, it will be noted that during the initial cycle of the shuttle carriage 28b servicing the cell plating section 20b, a second shuttle carriage 28c shown in phantom is operative to deliver an empty work rack *j* to the rack return station 9 and thereafter to remove a completed work rack *k* from station 10 and advance it through the next series of treating stations either in a shuttle or successive transfer sequence as hereinbefore described. Returning again to FIG. 16D, the shuttle carriage 28b, after depositing the rack *e* at station 10, is advanced from the position shown in FIG. 16D to the position shown in FIG. 16E wherein the lift mechanism 40a is disposed below and in vertical alignment with the empty rack *j* at station 9. The life mechanism 40*a* is thereafter raised, effecting movement of the work rack *j* from the position shown in solid lines in FIG. 16E to the position shown in phantom. After the work rack *j* has attained the fully elevated position, the shuttle carriage is advanced from the position shown in FIG. 16E to the position shown in FIG. 16F wherein the empty rack *j* is positioned in vertical alignment above rack return station 2.

Referring back again now to FIGS. 16C and D, it will be noted that a shuttle carriage 28*a* of the preceding treating section 20*a* as shown in phantom is operative to deposit a work rack *a* at station 1 vacated by work rack *b* and is operative to remove an empty rack *c* from the rack return station 2. Accordingly, when the shuttle carriage 28*b* with the empty work rack *j* is advanced to the position as shown in FIG. 16F, the lift mechanism 40*a* is operative during its lowering movement to deposit the empty rack *j* at the rack return station to be subsequently removed and conveyed toward the load station at the beginning of the plating machine. After the empty rack *j* has been deposited at the rack return station 2, the shuttle carriage 28*b* is moved from the position shown in FIG. 16F to the position shown in FIG. 16G, whereby the work rack *a* is withdrawn from station 1 from the position shown in solid lines to the elevated position shown in phantom.

At about the same time, the shuttle carriage 28*c* of the next treating section 20*c* is operative to remove the work rack *e* deposited at station 10 and to deposit an empty work rack *l* at the rack return station 9. The shuttle carriage 28*b* in the position as shown in FIG. 16G with the work rack *a* suspended therefrom is next transferred in accordance with the cycle previously described effecting a withdrawal of the next work rack which has completed its treating time in a treatment cell and the replacement thereof with the work rack *a*.

Further processing versatility is provided by the shuttle conveying machine comprising the present invention whereby a skip or a short dip operation of the work racks can be achieved at one or more selected stations of the treating operation. FIGS. 17A–D illustrates a sequential transfer of the work carriers or racks through a series of treating stations employing a double-lift single-station advance in accordance with the sequence described in connection with 13A–D but wherein the treating receptacle at station 5 is skipped. The shuttle carriage 28 is illustrated in FIG. 17A in the position corresponding to FIG. 13B in which the work racks *f* and *g*, after being withdrawn from stations 6 and 7, respectively, are lowered at stations 7 and 8, respectively, as shown in phantom in FIG. 17A. The shuttle carriage thereafter is transferred from the position shown in FIG. 17A to the position shown in FIG. 17B until the lift mechanisms 40*a*, 40*b*, are disposed beneath and in vertical alignment with the work racks *c* and *d*, respectively, at stations 3 and 4. The lift mechanisms 40*a*, 40*b* thereafter are actuated, effecting elevation of the work racks *c* and *d* from the position shown in solid lines in FIG. 17B to the raised position as shown in phantom.

The shuttle carriage 28 thereafter is advanced one station to the position shown in FIG. 17C, whereby the work rack *c* is positioned above and in alignment with the rack supports at station 4, after which the work rack *c* is lowered to the position shown in phantom. The work rack *d*, however, disposed above station 5 which is being skipped, is retained in the elevated position. The shuttle carriage thereafter is advanced from the position shown in FIG. 17C to the position shown in FIG. 17D wherein the work rack *d* is then lowered from the position shown in solid lines to the position shown in phantom in station 6. In accordance with the foregoing sequence, the work racks are successively advanced through the treating receptacles comprising stations 2–7 and wherein each of the work racks skips immersion in the treating receptacle at station 5.

A similar sequence to that described in connection with FIGS. 17A–D but wherein a short dip rather than a skip of the work racks occurs at station 5 is illustrated in FIGS. 18A–C. FIG. 18A illustrates the work racks *c* and *d* in a raised position as shown in solid lines corresponding substantially to the position of the work racks in FIG. 17C. Both of the lift mechanisms 40*a*, 40*b* are energized, effecting a lowering of the work racks *c* and *d* into stations 4 and 5, respectively, as shown in phantom. When both of the lift mechanisms attain the lowered position as shown in FIG. 18B, the lift mechanism 40*a* is retained in the lowered position, whereas the lift mechanism 40*b* is again elevated effecting a withdrawal of the work rack *d* after a short dip in station 5 to the raised position as shown in phantom in FIG. 18B. After the work rack *d* has again attained the elevated position, the shuttle carriage is advanced from the position shown in FIG. 18B to the position shown in FIG. 18C, wherein the work rack *d* is disposed above and in alignment with station 6. In that position the lift mechanism 40*b* is energized, effecting a lowering of the rack *d* from the position shown in solid lines to the position shown in phantom in FIG. 18C. In accordance with this sequence, each of the work racks is successively exposed to a short dip in station 5 and is thereafter withdrawn and deposited in station 6 in a manner as hereinbefore described.

It is also contemplated that two or more skip or short dip stations or combinations thereof can be provided in one or more of the machine sections to achieve the desired treatment of the workpieces on the work racks. Additionally the skip or short dip operation is equally applicable to the shuttle type operating cycle and the selective cell cycle previously described. For example, in the selective cell operating cycle, skip operation can be simply achieved by deactivating one cell so that no work racks are deposited in that cell. Similarly, a selective dip operation of successive or selected ones of the work racks can be achieved by employing a vacant cell to which the work racks from the input end are transferred, lowered for a short duration dip, after which they are withdrawn and advanced to the output or unload end of the cell plating section. Those work racks which are to be subjected to the conventional treating cycle are deposited in the remaining cells in a preselected sequence in accordance to that previously described. In a similar manner, the shuttle type operating cycle is also adaptable to a selective skip or short dip at one or more treating stations to provide the optimum treating cycle consistent with the nature of the workpieces being processed.

Figure 19:
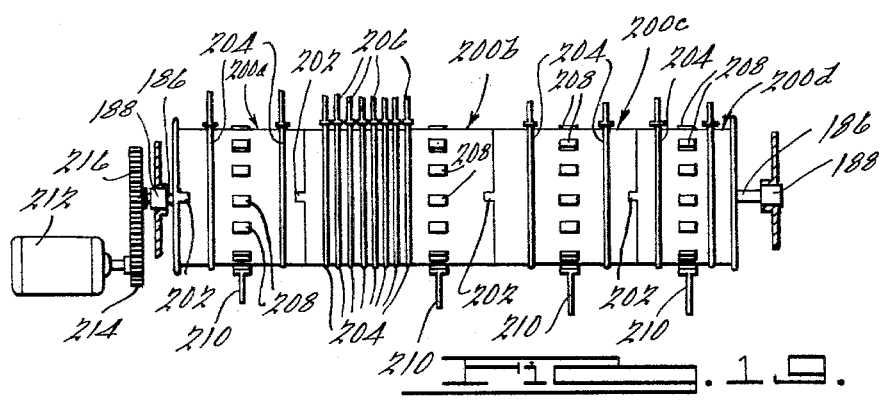
FIG. 19 is a schematic plan view of a sequencing drum in the central control circuit for achieving a preselected, sequentially phased operating cycle of the shuttle carriage and lift mechanisms thereon.

Either one or variations of the foregoing operating sequence of the shuttle carriage and the lift mechanisms thereon are automatically controlled by suitable sequencing means incorporated in the central control circuit which is electrically connected to the several shuttle carriage limit switches and lift mechanism limit switches in a conventional manner well known in the art. The sequencing means for providing automatic sequential operation of the transfer motor and lift mechanism motors in a preselected sequence may include one or combinations of stepping switches of the type employed in telephone circuitry or, alternatively, may comprise a sequencing drum of the type shown in FIG. 19. The sequencing drum as shown in FIG. 19 is mounted on a shaft 186 which is rotatably journaled in supporting bearings 188. Over the periphery of the drum, a series of sleeves 200*a*, 200*b*, 200*c*, 200*d* are removably mounted and interlocked to each other by coacting grooves and notches indicated at 202 to maintain the sleeves in appropriate relative position. Each of the sleeves incorporates one or more contact rings 204 extending therearound which are disposed in constant electrical contact with a contact brush 206. Each of the sleeves is also provided with a plurality of spaced contacts 208 disposed in circumferentially spaced relationship around the sleeve which are electrically connected to selected ones of the contact rings adjacent thereto. A stationary contact brush 210 is disposed adjacent to the spaced contacts 208 along each of the sleeves 200a, 200b, 200c, 200d for effecting energization of a selected relay in accordance with the particular spaced contact with which the contact brush is in electrical contact.

The sequence drum is intermittently rotated by a suitable control motor 212 which is provided with a drive gear 214 on the output shaft thereof that is disposed in constant meshing relationship with a driven gear 216 affixed to the shaft 186 of the sequence drum. Accordingly, as the drum is rotated, the stationary contact brushes 210 successively contact the spaced contacts 208, effecting a preselected energization of the station limit switches, the reversible transfer motor, and the reversible lift motors of each of the lift mechanisms on the shuttle carriage.

The sleeve 200a, for example, is operative to energize the transfer motor effecting rotation thereof in either one of two directions for effecting movement of the shuttle carriage along the rails in the desired direction. The sleeve 200b is operative to energize the appropriate one of the station limit switches LS3 through the stationary contact brush 210, the spaced contacts 208, the selected contact ring 204 and contact brush 206 in electrical contact therewith. Similarly, the sleeves 200c are operative to selectively energize one of the reversible lift motors, effecting rotation thereof in the appropriate direction to achieve the desired lifting or lowering movement thereof. The sleeve 200d is operative to achieve a similar preselected energization of the other lift motor. Additional sleeves may be provided for effecting selected lowering and raising of a third, fourth, etc., lift mechanism on a multiple lift shuttle carriage.

The several contact brushes 206, 210 are electrically connected by conductors in a conventional manner to the necessary motor relays, latching relays, and control relays to provide a coordinated operation of the several components consistent with the specific position of the sequence drum and the spaced contacts 208 thereon relative to the stationary contact brushes and spaced contacts. For example, on the initiation of an operating cycle such as the single station advance double-lift cycle shown in FIGS. 13A–13D, the transfer motor is energized through the spaced contacts 208 disposed in electrical contact with the stationary contact brush 210 and the contact brush 206 in sliding electrical contact with the contact ring 204 of the sleeve 200a whereby the shuttle carriage advances from the load end of the machine to the position as shown in FIG. 13A. At the same time, the sleeve 200b is oriented so that the station limit switch at station 7 is energized, stopping the carriage with the lift mechanisms 40a, 40b in vertically aligned position beneath the work racks f and g. The tripping of the station limit switch LS3 at station 7 de-energizes the transfer motor such as by unlatching a suitable latch relay and similarly energizes the control motor 212 of the sequence drum, effecting further indexing thereof to the next position.

When the next position is attained, the appropriate spaced contacts 208 on the sleeves 200c, 200d are aligned with the stationary contact brushes 210, effecting energization of both of the lift motors in a direction so as to effect a lifting movement of the lift mechanisms thereon. When the lift mechanisms attain the elevated position as signaled by the actuation of the up position limit switches LS1, the lift mechanism motors are de-energized and the control motor 212 is energized, advancing the sequence drum to the next position. When the next position is attained, the appropriate spaced contact on the sleeve 200a is indexed relative to the stationary contact brush 210, effecting energization of the transfer motor effecting advancement of the shuttle carriage from the position shown in FIG. 13A to the position shown in FIG. 13B. At the same time, the stationary contact brush 210 is disposed in electrical contact with the appropriate spaced contact 208 of the sleeve 200b, effecting an energization of the station limit switch LS3 at station number 8 which, the actuated responsive to the advancement of the shuttle carriage, effects de-energization of the transfer motor and indexes the sequencing drum to the next position. Accordingly, in the next position the lift motors are energized in accordance with the indexed space contacts 208 on the sleeves 200c and 200d, effecting a lowering of the lift mechanism and the work racks f and g thereon from the raised position as shown in solid lines in FIG. 13B to the lowered position shown in phantom. The foregoing sequence continues in the manner as previously described until all of the work racks have been transferred to the treating receptacles and during which time the sequence drum has completed one revolution. The sequential cycling of the transfer motor and the lift mechanisms thereafter continues through the same preselected sequence in accordance with the relative arrangement of the spaced contacts and contact brushes on the sleeves of the sequence drum.

Sequencing means of the foregoing type can be provided for each of the machine sections to control the movement of the shuttle carriage thereon providing for automatic transfer of the work racks through the prescribed processing cycle. As hereinbefore mentioned, the shuttle carriages of adjacent machine sections overlap at the ends of their travel to effect a transfer of the work racks from one section to the other. To avoid a clash of two shuttle carriages in this overlapping region, overriding control means are incorporated on one of the carriages which effects an overriding control of the transfer motor thereof whereby its movement is controlled by the other dominant carriage until the dominant carriage completes its operating cycle in the overlapping region. Conventionally, however, the operating cycle of the individual shuttle carriages are controlled so that no mutual interference is encountered along the overlapping regions separating the several machine sections.

A simple overriding control can comprise, for example, a shoe extending longitudinally of the supporting rails which, when depressed by one of the shuttle carriages, is operative to de-energize the transfer motor propelling the adjacent shuttle carriage when it approaches the overlapping region. In accordance with this arrangement, the shuttle carriage which first attains the overlapping region remains dominant until its cycle has been completed and is transferred out of the overlapping region releasing the tripping bar whereby the second shuttle carriage thereafter continues its sequence as controlled by its sequencing drum. Alternatively, one of the shuttle carriages is provided with a sensing switch as shown in FIG. 20 which projects longitudinally therefrom and is operative on contact with the adjacent shuttle carriage to effect either a de-energization of the transfer motor or a reversal thereof to withdraw from the path of an advancing adjacent shuttle carriage.

Figure 20:
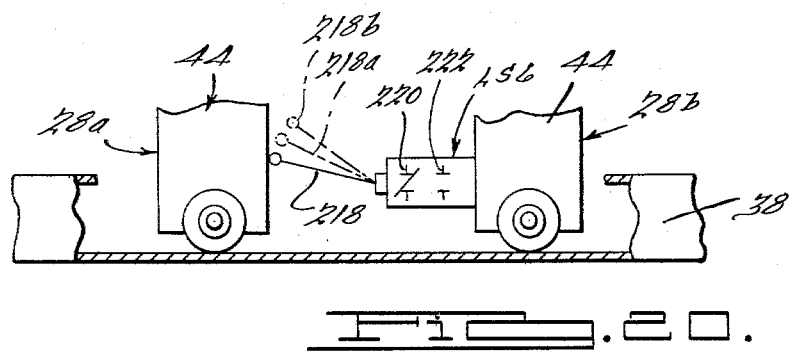
FIG. 20 is a fragmentary schematic side elevation view of a shuttle carriage incorporating thereon an overriding control switch for preventing interference between adjacent shuttle carriages.

The arrangement as schematically shown in FIG. 20 illustrates an overriding two-position limit switch LS6 mounted on the longitudinal side member 44 of one shuttle carriage 28b and projecting forwardly therefrom toward an adjacent shuttle carriage 28a. The limit switch LS6 is provided with an actuator rod 218 which is adapted to contact the side member 44 of the adjacent shuttle carriage 28a supported on the continuous supporting rail 38. The limit switch LS6 as schematically illustrated is provided with a normally closed contact 220 which is disposed in series with control circuit for energizing the transfer movement of the shuttle carriage 28b. A second normally open contact 222 is provided which is adapted to be connected to a reversing control relay, effecting a reversal of the direction of rotation of the transfer motor and a corresponding reversal in the direction of movement of the shuttle carriage 28b.

In operation, assume that the shuttle carriage 28a is positioned on the supporting rail 38 in the overlapping region between machine sections and is completing its transfer cycle. At the same time, the shuttle carriage 28b is being advanced toward the left as viewed in FIG. 20 to a position where the actuator rod 218 contacts the side member 44 of the shuttle carriage 28a. The actuator rod 218 is accordingly moved from the position shown in solid lines to the dotted position shown in phantom and indicated at 218a. Movement of the actuator rod to the position indicated 218a effects an opening of the normally closed contacts 220 which de-energizes the transfer motor, halting the advancing movement of the shuttle carriage 28b.

In the event the shuttle carriage 28a during the completion of its operating cycle is transferred toward the right as viewed in FIG. 20, the actuator rod 218 is further deviated to the position indicated in phantom and designated 218b which effects a closing of normally open contact 222 which closes a reversing relay re-energizing the transfer motor of the shuttle carriage 28b which causes the shuttle carriage 28b to withdraw from the advancing movement of the shuttle carriage 28a. This continues until the shuttle carriage 28a halts, at which time the shuttle carriage 28b continues to withdraw until the actuator rod 218 moves from the position 218b to the position 218a, effecting an opening of normally open contact 222 and a de-energization of the reversing relay and a de-energization of the transfer motor. When the shuttle carriage 28a is withdrawn toward the left at the completion of this cycle, the actuator rod 218 is released and assumes the position as shown in solid lines in FIG. 20, whereupon the normally closed contact 220 is closed and the transfer motor of the shuttle carriage 28b is energized in accordance with the sequence as selected by the sequencing drum and advances until the appropriate station limit switch is tripped. It will be appreciated that the inclusion of a limit switch LS6 on each of the shuttle carriages of a machine incorporating a plurality of machine sections will avoid any interference therebetween in the event one shuttle carriage has not completed its operating sequence in the overlapping region between treating sections.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A conveying machine comprising a framework, rail means on said framework extending along a series of treating stations, work rack supporting means at each of said treating stations, a shuttle carriage movably mounted on said rail means, reversible drive means for moving said carriage back and forth between any two or more stations along said rail means, said carriage comprising a frame including a plurality of longitudinally spaced pairs of upright guide members disposed in spaced transverse relationship, a lift member guidably disposed between each of said pairs of guide members and including rack engaging means thereon for coacting with engaging means on a work rack for suspending the rack above the treating stations, reversible power means on said carriage for independently moving each of said lift members and a work rack suspended therefrom to and from a raised position and a lowered position over the treating stations, first sensing means on said carriage for sensing said raised and said lowered positions of each of said lift member, second sensing means for sensing the vertical aligned relationship between said work rack supporting means and said lift members, and control means operable in response to said first and said second sensing means for selectively energizing and deenergizing said reversible drive means and said reversible power means for intermittently moving said carriage and each of said lift members thereon in a preselected sequentially phased operating cycle for conveying the worn racks through the treating stations.

2. A conveying machine comprising a framework, rail means on said framework extending along a series of treating stations, work rack supporting means at each of said treating stations, a shuttle carriage movably mounted on said rail means, reversible drive means for moving said carriage back and forth between any two or more stations along said rail means, said carriage comprising a frame including a plurality of longitudinally spaced pairs of upright guide members disposed in spaced transverse relationship, a lift member guidably disposed between each of said pairs of guide members and including rack engaging means thereon for coacting with engaging means on a work rack for suspending the rack above the treating stations, reversible power means on said carriage for independently moving each of said lift members and a work rack suspended therefrom to and from a raised position and a lowered position over the treating stations, each said lift member when in said lowered position disposed with said rack engaging means thereon positioned below and in longitudinal clearance relationship relative to said engaging means on a work rack supported on said rack supporting means, first sensing means on said carriage for sensing said raised and said lowered positions of each of said lift members, second sensing means for sensing the vertical aligned relationship between said work rack supporting means and said lift members, and control means operable in response to said first and said second sensing means for selectively energizing and deenergizing said reversible drive means and said reversible power means for intermittently moving said carriage and each of said lift members thereon in a preselected sequentially phased operating cycle for conveying the work racks through the treating stations.

3. The conveying machine as described in claim 1 wherein said carriage comprises a plurality of shuttle units coupled to each other and movable in unison along said rail means, and wherein each of said units includes one of said pairs of upright guide members thereon.

4. The conveying machine as described in claim 1 wherein said framework and said treating stations are arranged in a plurality of spaced-apart rows, said machine further including transfer means extending between at least one of the ends of adjacent said rows for transferring said carriage from the end of one of said rows to the end of the other of said rows of said treating stations in coordinated relationship with said operating cycle.

5. The conveying machine as described in claim 1 wherein said rail means comprises a monorail extending centrally above and longitudinally of said treating stations.

6. The conveying machine as described in claim 1 wherein said treating stations are arranged with a load station at one end thereof and an unload station at the opposite end thereof and wherein said preselected sequentially phased operating cycle of said carriage is operative for advancing loaded work racks from said load station in a preselected sequence through said treating stations so said unload station and for returning the unloaded work racks from the unload station over the treating stations to said load station.

7. The conveying machine as described in claim 2 wherein said treating stations are arranged with a load station at one end thereof and an unload station at the opposite end thereof and wherein said preselected sequentially phased operating cycle of said carriage is operative for advancing loaded work racks from said load station in a preselected sequence through said treating stations to said unload station and for returning the unloaded work racks from the unload station over the treating stations to said load station.

8. A conveying machine comprising a framework, rail means on said framework extending along a series of treating stations, work rack supporting means at each of said treating stations, a plurality of shuttle carriages movably mounted on said rail means, reversible drive means for independently moving each of said carriages back and forth between any two or more stations along selected portions of said rail means, each said carriage comprising a frame including a pair of spaced upright guide members disposed in spaced transverse relationship, at least one of said carriages including a plurality of pairs of said spaced upright guide members disposed in longitudinally spaced relationship, a lift member guidably disposed between each of said pairs of guide members and including rack engaging means thereon for coacting with engaging means on a work rack for suspending the rack above the treating stations, reversible power means on each of said carriages for independently moving each of said lift members and a work rack supported therefrom to and from a raised position and a lowered position over the treating stations, first sensing means on each of said carriages for sensing said raised and said lowered positions of each of said lift members thereon, second sensing mean for sensing the vertical aligned relationship between said work rack supporting means and said lift members on said carriages, and control means operable in repsonse to said first and said second sensing means for selectively energizing and deenergizing said reversible drive means and said reversible power means for intermittently and independently moving said carriages and each of said lift members thereon in a preselected sequentially phased operating cycle for conveying the work racks through the treating stations.

9. A conveying machine comprising a framework, rail means on said framework extending along a series of treating stations, work rack supporting means at each of said treating stations, a plurality of shuttle carriages movably mounted on said rail means, reversible drive means for independently moving each of said carriages back and forth between any two or more stations along selected portions of said rail means, each said carriage comprising a frame including a pair of spaced upright guide members disposed in spaced transverse relationship, at least one of said carriages including a plurality of pairs of said spaced upright guide members disposed in longitudinally spaced relationship, a lift member guidably disposed between each of said pairs of guide members and including rack engaging means thereon for coacting with engaging means on a work rack for suspending the rack above the treating stations, reversible power means on each of said carriages for independently moving each of said lift members and a work rack supported therefrom to and from a raised position and a lowered position over the treating stations, each said lift member when in said lowered position disposed with said rack engaging means thereon positioned below and in longitudinal clearance relationship relative to said engaging means on a work rack supported on said rack supporting means, first sensing means on each of said carriages for sensing said raised and said lowered positions of each of said lift members thereon, second sensing means for sensing the vertical aligned relationship between said work rack supporting means and said lift members on said carriages, and control means operable in response to said first and said second sensing means for selectively energizing and deenergizing said reversible drive means and said reversible power means for intermittently and independently moving said carriages and each of said lift members thereon in a preselected sequentially phased operating cycle for conveying the work racks through the treating stations.

10. The conveying machine as described in claim 8 wherein said framework and said treating stations are arranged in a plurality of spaced-apart rows, said machine further including transfer means extending between at least one of the ends of adjacent said rows for transferring said carriages from the end of one of said rows to the end of another of said rows of said treating stations and in alignment with said rail means therealong in coordinated relationship with said operating cycle.

11. The conveying machine as described in claim 8 wherein said framework and said treating stations are arranged in the form of a first row and a second row disposed in spaced relationship, said machine further including second rail means extending between the adjacent ends of said first row and said second row, and transfer means on said second rail means for transferring work racks from the end of one of the rows to the other of the rows in coordinated relationship with said operating cycle of said carriages.

12. The conveying machine as described in claim 8 wherein said treating stations include a work rack return station disposed between said selected portions of said rail means along which each of said carriages is independently movable, said stations further including a load station at one end thereof and an unload station at the opposite end thereof, said preselected sequentially phased operating cycle of said carriages operative for advancing loaded work racks from said load station to said unload station and for returning the unloaded work racks from said unload station to said work rack return station and thereafter to said load station over the treating stations.

13. The conveying machine as described in claim 8 further including means operatively connected to said reversible drive means of at least one of said carriages for overriding said reversible drive means of one of said carriages responsive to the presence of the adjacent carriage in an overlapping region of their respective paths of travel along said rail means.

14. The conveying machine as described in claim 9 further including means operatively connected to said reversible drive means of at least one of said carriages for overriding said reversible drive means of one of said carriages responsive to the presence of the adjacent carriage in an overlapping region of their respective paths of travel along said rail means.

References Cited by the Examiner

UNITED STATES PATENTS

| | | | |
|---|---|---|---|
| 679,535 | 7/1901 | Moore | 212—26 |
| 1,988,885 | 1/1935 | Neuman. | |
| 2,175,788 | 10/1939 | Todd | 214—17 |
| 2,539,898 | 1/1951 | Davis. | |
| 2,605,882 | 8/1952 | Curtis | 214—89 X |
| 2,708,715 | 5/1955 | Meyers | 246—31 |
| 2,728,466 | 12/1955 | Postlewaite | 214—89 |
| 2,732,962 | 1/1956 | Bullard | 214—89 |
| 2,822,937 | 2/1958 | Fox | 104—88 |
| 2,874,852 | 2/1959 | Frederick et al. | 214—89 |
| 2,933,212 | 4/1960 | Houck | 214—89 |
| 2,958,330 | 11/1960 | Huenerfauth | 214—89 X |
| 2,959,267 | 11/1960 | Boutillier et al. | 198—19 |
| 2,987,201 | 6/1961 | Abbey | 214—89 |
| 2,997,005 | 8/1961 | Chapin et al. | 212—22 X |
| 3,088,610 | 5/1963 | Pianowski | 214—89 |
| 3,107,019 | 10/1963 | Malzahn et al. | 214—89 |
| 3,138,357 | 6/1964 | Whitwell et al. | 246—31 X |
| 3,148,631 | 9/1964 | Gorjanc | 104—88 |

FOREIGN PATENTS

| | | |
|---|---|---|
| 1,215,758 | 11/1959 | France. |
| 127,371 | 8/1959 | Russia. |

GERALD M. FORLENZA, *Primary Examiner.*

MORRIS TEMIN, *Examiner.*